US012448482B2

(12) United States Patent
Klier et al.

(10) Patent No.: US 12,448,482 B2
(45) Date of Patent: Oct. 21, 2025

(54) COMPOSITIONS AND METHODS FOR BIODEGRADABLE, BIOMASS-BASED POLYESTERS

(71) Applicant: UNIVERSITY OF MASSACHUSETTS, Boston, MA (US)

(72) Inventors: John Klier, Leverett, MA (US); Kelsi Marie Skeens Rehmann, Amherst, MA (US); Lei Zheng, Boston, MA (US)

(73) Assignee: University of Massachusetts, Boston, MA (US)

( * ) Notice: Subject to any disclaimer, the term of this patent is extended or adjusted under 35 U.S.C. 154(b) by 19 days.

(21) Appl. No.: 18/746,395

(22) Filed: Jun. 18, 2024

(65) Prior Publication Data

US 2024/0336728 A1 Oct. 10, 2024

Related U.S. Application Data

(63) Continuation of application No. 17/935,252, filed on Sep. 26, 2022, now abandoned.

(60) Provisional application No. 63/248,646, filed on Sep. 27, 2021.

(51) Int. Cl.
*C08G 63/183* (2006.01)

(52) U.S. Cl.
CPC .................. *C08G 63/183* (2013.01)

(58) Field of Classification Search
USPC ................. 528/190, 193, 194, 302
See application file for complete search history.

(56) References Cited

U.S. PATENT DOCUMENTS

| | | |
|---|---|---|
| 5,376,735 A | 12/1994 | Sublett |
| 5,580,911 A | 12/1996 | Buchanan et al. |
| 5,868,438 A | 2/1999 | Svetlik |
| 6,140,422 A | 10/2000 | Khanarian et al. |
| 6,201,034 B1 | 3/2001 | Warzelhan et al. |
| 6,740,377 B2 | 5/2004 | Pecorini et al. |
| 8,273,846 B2 | 9/2012 | Nefzger et al. |
| 8,772,515 B2 | 7/2014 | Dumesic et al. |
| 9,242,952 B2 | 1/2016 | Dumesic et al. |
| 9,255,194 B2 | 2/2016 | Allen et al. |
| 9,617,234 B1 | 4/2017 | Dumesic et al. |
| 10,077,224 B1 | 9/2018 | Huber et al. |
| 2005/0261465 A1 | 11/2005 | Nagarajan |
| 2008/0103340 A1 | 5/2008 | Binder et al. |
| 2011/0112270 A1 | 5/2011 | Meltzer |
| 2015/0111450 A1 | 4/2015 | Nederberg et al. |
| 2017/0145153 A1 | 5/2017 | Jacquel et al. |
| 2017/0190832 A1 | 7/2017 | Jacquel |

FOREIGN PATENT DOCUMENTS

| | | |
|---|---|---|
| EP | 2431456 A1 | 3/2012 |
| EP | 2628758 A1 | 8/2013 |
| WO | 03/066704 A1 | 8/2003 |
| WO | 2015/045562 A1 | 4/2015 |
| WO | 2015/156802 A1 | 10/2015 |
| WO | 2016/102361 A1 | 6/2016 |
| WO | 2017/156269 A1 | 9/2017 |
| WO | WO-2025079717 A1 * | 4/2025 ............. H10K 59/10 |

OTHER PUBLICATIONS

WO 2025079717 Machine Translation (Year: 2025).*
Alamillo et al., "The selective hydrogenation of biomass-derived 5-hydroxymethylfurfural using heterogeneous catalysts," Green Chemistry, May 2012, vol. 14, No. 5, pp. 1413-1419.
Barnett et al., "Autocatalytic Hydration of Dihydropyran to 1,5-Pentanediol Precursors via in situ Formation of Liquid- and Solid-Phase Acids," ACS Sustainable Chemistry & Engineering, Sep. 2017, vol. 5, pp. 10223-10230.
Brentzel et al., "Chemicals from Biomass: Combining Ring-Opening Tautomerization and Hydrogenation Reactions to Produce 1,5-Pentanediol from Furfural," ChemSusChem, Apr. 2017, vol. 10, pp. 1351-1355.
Bruyn et al., "A new perspective in bio-refining: levoglucosenone and cleaner lignin from waste biorefinery hydrolysis lignin by selective conversion of residual saccharides," Energy & Environmental Science, Aug. 2016, vol. 9, pp. 2571-2574.
Burgess et al., "Carbon Dioxide Sorption and Transport in Amorphous Poly(ethylene furanoate)," Macromolecules, Apr. 2015, vol. 48, pp. 2184-2193.
Burgess et al., "Oxygen sorption and transport in amorphous poly(ethylene furanoate)," Polymer, Aug. 2014, vol. 55, pp. 4748-4756.
Burt et al., "Production of 1,6-hexanediol from tetrahydropyran-2-methanol by dehydration-hydration and hydrogenation," Green Chemistry, Feb. 2017, vol. 19, pp. 1390-1398.
Cao et al., "Dehydration of cellulose to levoglucosenone using polar aprotic solvents," Energy & Environmental Science, May 2015, vol. 8, pp. 1808-1815.
Garcia et al., "The future of plastics recycling," Science, Nov. 2017, vol. 358, Issue No. 6365, pp. 870-873.
Han et al., "Composition, Thermal Properties, and Biodegradability of a New Biodegradable Aliphatic/Aromatic Copolyester," Journal of Applied Polymer Science, Apr. 2009, vol. 113, pp. 1298-1306.
He et al., "New catalytic strategies for α,ω-diols production from lignocellulosic biomass," Farady Discuss, Mar. 2017, vol. 202, pp. 247-267.

(Continued)

*Primary Examiner* — Terressa Boykin
(74) *Attorney, Agent, or Firm* — Thomas | Horstemeyer, LLP

(57) ABSTRACT

The disclosure relates to biomass-based polyester materials; methods of making biomass-based polyester materials; polyester compositions comprising the disclosed biomass-based polyester materials; polymer compositions comprising the biomass-based polyester materials and one or more additional polymer, including a conventional or non-biomass-based polymer; and articles comprising the disclosed biomass-based polyester materials or disclosed polymer compositions comprising a disclosed biomass-based polyester materials.

9 Claims, No Drawings

(56) References Cited

OTHER PUBLICATIONS

He et al., "Production of levoglucosenone and 5-hydroxymethylfurfural from cellulose in polar aprotic solvent-water mixture," Green Chemistry, Jun. 2017, vol. 19, pp. 1-26.
Herrera et al., "Characterization and Degradation Behavior of Poly(butylene adipate-co-terephtalate)s," Journal of Polymer Science: Part A: Polymer Chemistry, Dec. 2002, vol. 40, pp. 4141-4157.
Horn et al., "Mechanisms of Organocatalytic Amidation and Trans-Esterification of Aromatic Esters as a Model for the Depolymerization of Poly(ethylene) Terephthalate," The Journal of Physical Chemistry, Nov. 2012, vol. 116, pp. 12389-12398.
Hu et al., "Upgrading biomass-derived furans via acid-catalysis/ hydrogenation: the remarkable difference between water and methanol as the solvent," Green Chemistry, Jan. 2015, vol. 17, pp. 219-224.
Huang et al., "Conversion of Furfural to 1,5-Pentanediol: Process Synthesis and Analysis," ACS Sustainable Chemistry & Engineering, Apr. 2017, vol. 5, pp. 4699-4706.
Huang et al., "Improving economics of lignocellulosic biofuels: An integrated strategy for coproducing 1,5-pentanediol and ethanol," Applied Energy, Mar. 2018, vol. 213, pp. 585-594.
Jambeck et al., "Plastic waste inputs from land into the ocean," Science, Feb. 13, 2015, vol. 347, Issue No. 6223, pp. 768-771.
Jung et al., "Validation of ATR FT-IR to identify polymers of plastic marine debris, including those ingested by marine organisms," Marine Pollution Bulletin, Feb. 2018, vol. 127, pp. 704-716.
Karayannidis et al., "Chemical Recycling of PET by Glycolysis: Polymerization and Characterization of the Dimethacrylated Glycolysate," Macromolecular Materials and Engineering, Nov. 9, 2006, vol. 291, pp. 1338-1347.
Karayannidis et al., "Chemical Recycling of Poly(ethylene terephthalate)," Macromolecular Materials and Engineering, Feb. 2, 2007, vol. 292, pp. 128-146.
Kosmidis et al., "Poly(ethylene terephthalate) Recycling and Recovery of Pure Terephthalic Acid. Kinetics of a Phase Transfer Catalyzed Alkaline Hydrolysis," Macromolecular Materials and Engineering, Oct. 2001, vol. 286, pp. 640-647.
Krishna et al., "Catalytic Production of Hexane-1,2,5,6-tetrol from Bio-renewable Levoglucosanol in Water: Effect of Metal and Acid Sites on (Stereo-Selectivity)," Green Chemistry, Sep. 2018, Issue 19, 18 pages.
Krishna et al., "Hydrogenation of Levoglucosenone to Renewable Chemicals," Green Chemistry, Mar. 2017, Issue 5,16 pages.
Krishna et al., "Mechanistic Insights into the Hydrogenolysis of Levoglucosanol over Bifunctional Platinum Silic-Alumina Catalysts," ACS Catalysis, Mar. 23, 2018, vol. 8, pp. 3743-3753.
Krishna et al., "Oxygenated Commodity Chemicals from Chemo-Catalytic Conversion of Biomass Derived Heterocycles," American Institute of Chemical Engineers, Jun. 2018, vol. 64, No. 6, pp. 1910-1922.
Li et al., "Gas-phase dehydration of tetrahydrofurfuryl alcohol to dihydropyran over y-Al2O3," Applied Catalysis B: Environmental, May 2019, vol. 245, pp. 62-70.

Lu et al., "High Molecular Weight Polyesters Derived from Biobased 1,5-Pentanediol and a Variety of Aliphatic Diacids: Synthesis, Characterization, and Thermo-Mechanical Properties," ACS Sustainable Chemistry & Engineering, May 28, 2017, vol. 5, pp. 6159-6166.
Luterbacher et al., "Nonenzymatic Sugar Production from Biomass Using Biomass-Derived y-Valerolactone," Science, Jan. 17, 2014, vol. 343, pp. 277-280.
Motagamwala et al., "Toward biomass-derived renewable plastics: Production of 2,5-furandicarboxylic acid from fructose," Science Advances, Jan. 19, 2018, vol. 4, pp. 1-8.
Muller et al., "Biodegradation of polyesters containing aromatic constituents," Journal of Biotechnology, Mar. 2001, vol. 86, pp. 87-95.
Nakagawa et al., "Catalytic Reduction of Biomass-Derived Furanic Compounds with Hydrogen," ACS Catalysis, Oct. 6, 2013, vol. 3, pp. 2655-2668.
Peng et al., "Hydrolytic degradation of biobased poly(butylene succinate-co-furandicarboxylate) and poly(butylene adipate-co-furandicarboxylate) copolyesters under mild conditions," Journal of Applied Polymer Science, Apr. 2017, vol. 134, Issue 15, 10 pages.
Sherwood et al., "Dihydrolevoglucosenone (Cyrene) as a bio-based alternative for dipolar aprotic solvents," Chemical Communications, Jul. 2014, vol. 50, pp. 9650-9652.
Siracusa et al., "Biodegradable polymers for food packaging: a review," Trends in Food Science & Technology, Dec. 2008, vol. 19, pp. 634-643.
Tosin et al., "Laboratory test methods to determine the degradation of plastics in marine environmental conditions," Frontiers in Microbiology, Jun. 21, 2012, vol. 3, Article No. 225, pp. 1-9.
Tullo, A., "Breaking in the New," C&EN Northeast News Bureau, Sep. 19, 2011, 5 pages.
Wang et al., "Biobased Amorphous Polyesters with High Tg: Trade-Off between Rigid and Flexible Cyclic Diols," ACS Sustainable Chemistry & Engineering, Feb. 27, 2019, vol. 7, pp. 6401-6411.
Wang et al., "Catalytic dehydration of C6 carbohydrates for the production of hydroxymethylfurfural (HMF) as a versatile platform chemical," Green Chemistry, Feb. 2014, vol. 16, pp. 548-572.
Weingarten et al., "Selective Conversion of Cellulose to Hydroxymethylfurfural in Polar Aprotic Solvents," ChemCatChem, Aug. 2014, vol. 6, pp. 2229-2234.
Witt et al., "Biodegradation Behavior and Material Properties of Aliphatic/Aromatic Polyesters of Commercial Importance," Journal of Environmental Polymer Degradation, Apr. 1997, vol. 5, No. 2, pp. 81-89.
Witt et al., "Biodegradation of aliphatic-aromatic copolyesters: evaluation of the final biodegradability and ecotoxicological impact of degradation intermediates," Chemosphere, Jul. 2001, vol. 44, pp. 289-299.
Xu et al., "Ethylene versus ethane: A DFT-based selectivity descriptor for efficient catalyst screening," Journal of Catalysis, Jun. 2018, vol. 362, pp. 18-24.
Zhu et al., "Synthesis and Biodegradation of Aliphatic Polyesters from Dicarboxylic Acids and Diols," Journal of Applied Polymer Science, Oct. 2003, vol. 90, pp. 982-990.

* cited by examiner

COMPOSITIONS AND METHODS FOR BIODEGRADABLE, BIOMASS-BASED POLYESTERS

CROSS-REFERENCE TO RELATED APPLICATIONS

This application is a continuation of U.S. application Ser. No. 17/935,252, having the title "COMPOSITIONS AND METHODS FOR BIODEGRADABLE, BIOMASS-BASED POLYESTERS" filed Sep. 26, 2022, which claims the benefit of and priority to U.S. Provisional Application Ser. No. 63/248,646, having the title "COMPOSITIONS AND METHODS FOR BIODEGRADABLE, BIOMASS-BASED POLYESTERS" filed Sep. 27, 2021, the disclosure of which are incorporated herein in by reference in their entirety.

BACKGROUND

There is a growing need for the manufacture of biomass-based polymers that utilize biomass-based monomers, in whole or in part, in lieu of petroleum-based monomers. The need is driven by statutory, regulatory, and political pressures to utilize renewable materials for manufacture of polymers, e.g., use of biomass-based monomers at least in part, if not wholly. Moreover, new biomass-based monomers provide new polymers that are likely to be amenable to biodegradation. However, despite advances in research directed to polymer materials that utilize biomass-based monomers and to improved biodegradeability, there is still a scarcity of suitable polymers that are biomass-based that have suitable properties allowing for widespread replacement of conventional materials, e.g., LDPE manufactured using petroleum-based materials, and that are amenable to biodegradation. These needs and other needs are satisfied by the present disclosure.

SUMMARY

In accordance with the purpose(s) of the disclosure, as embodied and broadly described herein, the disclosure, in one aspect, relates to biomass-based polyester materials; methods of making biomass-based polyester materials; polyester compositions including the disclosed biomass-based polyester materials; polymer compositions including the biomass-based polyester materials and one or more additional polymer, including a conventional or non-biomass-based polymer; and articles including the disclosed biomass-based polyester materials or disclosed polymer compositions including a disclosed biomass-based polyester materials.

Disclosed are methods of making a biomass-based polyester material, the method including the step of polycondensation of a first monomer component including at least one diol and a second monomer component including at least one dicarboxylic acid component, thereby forming a polyester; wherein polycondensation is carried out in the presence of a catalyst; and wherein the first monomer component and/or the second monomer component includes at least one biomass-based monomer component.

Also disclosed are biomass-based polyester materials made by a disclosed method.

Also disclosed are biomass-based polyester materials including repeating units derived from a first monomer component including at least one diol and repeating units derived from a second monomer component including at least one dicarboxylic acid component; wherein the repeating units derived from the first monomer component are present in an amount of from about 25 mol % to about 75 mol % (e.g., about 40 mol % to about 60 mol %, about 45 mol % to about 55 mol %, or about 50 mol %); wherein the repeating units derived from the second monomer component are present in an amount of from about 25 mol % to about 75 mol % (e.g., about 40 mol % to about 60 mol %, about 45 mol % to about 55 mol %, or about 50 mol %); wherein the ratio of the first monomer to the second monomer, on a molar basis, is from about 1.5:1 to about 1:1.5 or about 1.1:1 to about 1:1.1; wherein the mol % is based on the total all repeating units derived from the first monomer component and the repeating units derived from the second monomer component; wherein the repeating units are derived from at least one biomass-based monomer component; and wherein the at least one biomass-based monomer component can be the first monomer component, the second monomer component, and combinations thereof.

Also disclosed are polyester compositions including: (a) one or more disclosed biomass-based polyester materials or a biomass-based polyester material made by a disclosed method; and (b) an additional polyester material that is substantially not a biomass-based polyester material.

Also disclosed are polymer compositions including polymer composition including a disclosed biomass-based polyester material or a biomass-based polyester material made by a disclosed method, and one or more non-polyester polymers.

Also disclosed are polymer compositions including polymer composition including a disclosed biomass-based polyester material or a biomass-based polyester material made by a disclosed method, and one or more of (a) an additional polyester material that is substantially not a biomass-based polyester material; and/or (b) non-polyester polymer.

Also disclosed are articles including a disclosed biomass-based polyester material, a biomass-based polyester material made by a disclosed method, or a disclosed polymer composition.

Also disclosed are articles including a component including a disclosed biomass-based polyester material, a biomass-based polyester material made by a disclosed method, or a disclosed polymer composition.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. DEFINITIONS

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

Reference to "a" chemical compound refers to one or more molecules of the chemical compound rather than being limited to a single molecule of the chemical compound. Furthermore, the one or more molecules may or may not be identical, so long as they fall under the category of the chemical compound. Thus, for example, "a" chemical compound is interpreted to include one or more molecules of the chemical, where the molecules may or may not be identical (e.g., different isotopic ratios, enantiomers, and the like).

As used in the specification and the appended claims, the singular forms "a," "an" and "the" include plural referents unless the context clearly dictates otherwise. Thus, for example, reference to "a polyester," "a polymer," or "a monomer component," includes, but is not limited to, two or more such polyesters, polymers, or monomer components, and the like.

Reference to "a/an" chemical compound or polymer refers to one or more molecules of the chemical compound or polymer rather than being limited to a single molecule of the chemical compound or polymer. Furthermore, the one or more molecules may or may not be identical, so long as they fall under the category of the chemical compound or polymer. Thus, for example, "a" polyester is interpreted to include one or more polyester molecules of the polyester, where the polyester molecules may or may not be identical (e.g., different molecular weights within an acceptable molecular weight range or variable repeating unit structures).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a filler refers to an amount that is sufficient to achieve the desired improvement in the property modulated by the formulation component, e.g. achieving the desired level of tensile strength. The specific level in terms of wt % in a polyester composition required as an effective amount will depend upon a variety of factors including the end use intended for polyester, specific type of polyester, amount and type of filler, and end use of the article made using the polyester.

As used herein, the terms "optional" or "optionally" means that the subsequently described event or circumstance can or cannot occur, and that the description includes instances where said event or circumstance occurs and instances where it does not.

A "polymer" refers to a chemical compound or mixture of compounds whose structure is constituted of multiple repeating units linked by covalent chemical bonds. Within the context of the invention, the term polymer includes natural or synthetic polymers, constituting of a single type of repeat unit (i.e., homopolymers) or of a mixture of different repeat units (i.e., copolymers). Synthetic polymers include polymers derived from materials such as petroleum oil, such as polyolefins, conventional aliphatic or aromatic polyesters, polyamides, polyurethanes and polyvinyl chloride. Synthetic polymers, as disclosed herein, can also be derived from biomass-based materials, e.g., using monomers manufacture from biomass-based materials which provide repeating units based on those monomers that are biodegradeable, e.g., the polyesters disclosed herein. Natural polymers include lignin and polysaccharides, such as cellulose, hemicellulose, starch and derivatives thereof.

As used herein, a "conventional polyester" refers to a polyester such as a conventional polyethylene terephthalate or polyethylene terephthalate polymer, also abbreviated PET or PETE, are used interchangeably and refer to a thermoplastic polymer resin of the polyester family, produced using only monomers that are not biomass-based, e.g., monoethylene glycol (MEG) and dimethyl terephthalate (DMT) or purified terephthalic acid (PTA) obtained from conventional sources and materials. Conventional polyesters may exist both as an amorphous and as a semi-crystalline polymer. Moreover, conventional polyesters can include homopolymers and copolymers of PET. Examples of copolymers are polyethylene terephthalate glycol-modified (PETG), wherein cyclohexane dimethanol is added to the polymer backbone in place of ethylene glycol, or polyethylene terephthalate isophthalic acid-modified, wherein isophthalic acid replaces some of the linkage of terephthalate units, or bi-axially oriented PET (BOPET), or oriented PET (OPET), and the like.

As used herein, a "biomass-based polyester," such as those disclosed herein is a polyester made using monomer components, i.e., includes repeating units derived from such monomer components that are biobased materials. Biomass-based materials are manufactured in whole or substantially from a biological products or feedstock, as opposed to conventional polyesters which are made using monomer components that are manufactured in whole or substantially using petroleum derived materials and chemicals, i.e., petrochemicals.

The term "biodegradable" as used herein means that the polyester material can undergo a significant change in its chemical structure under specific environmental conditions resulting in a change of properties that may vary as measured by standard test methods, e.g., in the presence of naturally occurring microorganisms so that the film loses significant strength when placed in a biologically active environment, such as a composting environment.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, a 1,5-pentanediol residue in a polyester refers to one or more —O(CH$_2$)$_5$O— units in the polyester, regardless of whether pentane diol was used to prepare the polyester. Similarly, a terephthalic acid residue in a polyester refers to one or more moieties having a structure represented by the formula:

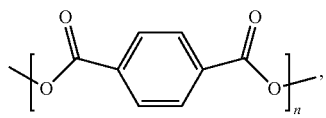

that are present in the polyester, regardless of whether the residue is obtained by reacting terephthalic acid or an ester thereof to obtain the polyester. In some instances, the residue can refer to a certain part or unit which is included within the resultant from the chemical reaction of particular compounds and which are derived from the particular compounds. For example, the "residue" of the dicarboxylic acid component and the "residue" of the diol component are the parts derived from the dicarboxylic acid component and from the diol component, respectively, in polyester formed from esterification or poly-condensation.

As used herein, the term "repeating unit" refers to a residue that repeats within the polymer structure, e.g., a 1,5-pentanediol residue. It is understood that repeating units may be linked and repeat. Moreover, a repeating unit can be a unit that includes different residues linked to one another, e.g., such as a repeating unit having the structure given by the formula:

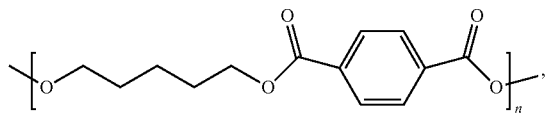

which is a repeating unit including a 1,5-pentanediol residues and terephthalic acid residues.

As used herein, "biomass-based," "renewably-based," or "renewable" denote that the carbon content is derived in whole or in part from renewable biological sources. In the present disclosure polyesters are disclosed, and methods of making same are disclosed, such that the repeating units are derived from monomer components that are derived from renewable biological sources. The monomer itself need not be directly isolated from a renewable biological source, but rather that the monomer is prepared using a synthesis method utilizing as a reactant or feedstock material obtained from a renewable biological source. That is, a biomass-derived monomer means that the monomer was synthesized from a biological precursor, and specifically a renewable biological carbon source, such as biomass (as opposed to a non-renewable petroleum-based carbon source).

Unless otherwise specified, temperatures referred to herein are based on atmospheric pressure (i.e., one atmosphere).

B. INTRODUCTION

Low density polyethylene (LDPE) is used to make single-use films for garbage bags and food packaging including grocery bags, stand-up pouches, and six-pack rings (Ref. 42). Thin, flexible packaging accumulates in landfills. Increased accumulation results in a significant amount of plastics escaping to the marine environment, creating disastrous effects on marine wildlife: in a study on 40 sea turtles, 2,880 plastic items were found in their stomachs, and 12% of those plastics were thin films (Ref. 43). Up to 4.6% of the plastics produced per year (approximately 12.7 million metric tons per year) are estimated to be in the marine environment from a combination of waste mismanagement and dumping trash in local waters (Ref. 44). Recycling and composting are used to mitigate plastic accumulation. Mechanical recycling is the most widely adopted type of recycling. However, flexible packaging is not easily mechanically recycled, because the films become stuck in the grinding machinery and recycled polymers have deteriorated properties due to molecular weight degradation and contamination (Ref. 45). The long, uninterrupted carbon-carbon bonds of polyolefins are the most difficult to break down, preventing composting completely and making chemical recycling economically intractable (Ref. 46). Thus, there is a critical unmet need to replace polyolefins with polymers that are easier to recycle and are biodegradable in case they escape into the environment.

Polyesters are a class of thermoplastic polymers that undergo degradation via hydroxyl attack in both chemical recycling processes (i.e. hydrolysis, methanolysis, or glycolysis) and biodegradation (in which hydrolysis is a major component; see Ref. 47). Polyethylene terephthalate (PET) is the most widely used polyester, yet this relatively inert material is challenging to chemically recycle due to the aromatic terephthalate group, which limits the susceptibility of the ester linkage to depolymerization and degradation. Chemical recycling is also energy intensive. In addition, PET does not have properties suitable for film packaging. In an aspect, the addition of the aliphatic monomer addresses and simultaneously improves biodegradation and improves properties appropriate for thin film packaging applications as well as a potential for more facile chemical recycling. The addition of aliphatic monomers to create co-polyesters increases the hydrolytic degradation rate, thereby increasing susceptibility to both depolymerization for recycling and environmental degradation (Ref. 46). Poly(butylene adipate terephthalate) (PBAT) is one type of aliphatic-aromatic polyester that was commercialized by BASF, Eastman, and Novamount as a biodegradable alternative for polyolefin (Refs. 48-51). However, commercial aliphatic aromatic polyesters have not become drop-in substitutes for thin polyolefin films. The aliphatic-aromatic polymers have similar melt points to LDPE, a crucial parameter to aid adoption by enabling the same processing set-up, yet the Young's modulus of these materials is only ⅓ of LDPE (Ref. 52). The modulus is directly related to the stiffness of the film, which is industrially measured as modulus multiplied by thickness. Stiffness is an important property for plastic films such as bags and packages as it allows the packages to withstand loads; consequently, the aliphatic-aromatic polyester films must be thicker than LDPE films to maintain the required stiffness. Not only does the increased thickness result in increased raw material costs, but this directly opposes an industry trend to downgauge. Downgauging is the ability to make plastic films thinner and thus more economical. Downgauging has been touted in the industry as a sustainable packaging solution because less material per end use item is discarded into landfills (Ref. 53).

Disclosed herein are a class of aromatic-aliphatic polyester that can more suitably replace LDPE. Embodiments of the present disclosure may enable the adaptation of biobased, biodegradable polymers for packaging and film applications, including grocery bags, garbage bags, food packaging, stand-up pouches, and six-pack rings. The polymers of the present disclosure can provide for a "drop in" replacement for LDPE in film packaging. In addition, the polymers of the present disclosure will also be easier to chemically recycle.

The disclosed polyesters are believed to provide advantages over LDPE such as recyclability, aquatic biodegradability, and competitive or improved mechanical properties. Embodiments of the present disclosure provide for polyesters that are: a) created from renewable feedstock (biobased), b) partially biodegradable (in composting and the marine environment), c) have thermo-mechanical and processing properties on par with LDPE to ensure easy adoption, and/or d) be easier to chemically recycle. Embodiments of the present disclosure provide for polyesters that are aliphatic-aromatic copolymers, in which the aromatic groups give good mechanical properties and the aliphatic groups enable biodegradability. In some aspect, polyesters of the present disclosure can include additional materials in the synthesis process to promote good mechanical properties (e.g., Young's modulus) and good processing properties (e.g., melt strength).

In some aspects, the disclosed biomass-based polyester materials that include high aromatic content aliphatic-aromatic compositions using a suitable diol such as biomass-based 1,5-pentanediol to provide polymers with suitable melting temperatures (e.g., greater than about 80° C. and high modulus values (e.g., close to the modulus values of conventionally manufactured LDPE or about 200 MPa). In a further aspect, utilizing bio-based 1,5-pentanediol to prepare the disclosed biomass-based polyester materials, it is believed the higher aromatic content can increase the mechanical properties of the polyesters to the level of LDPE while also keeping the melting temperature similar to LDPE. Although some polymers have been described that utilized 1,5-pentanediol into high aromatic content aliphatic-aromatic polyesters (Refs. 52 and 54), these polymers do not achieve workable melting and mechanical properties, which may be attributable to insufficient molecular weight even if at 85 mol % aromatic contents. The presently disclosed biomass-based polyester materials are believed to have better molecular weight through improvements in synthesis method, e.g., catalyst selection and processing variables such as agitation and vacuum; tight control of molecular weight is associated with improved mechanical properties, as well as monomer selection. By improving mechanical properties through molecular weight, the disclosed polymers could potentially have lower aromatic content, further enhancing depolymerization recycling and degradation properties.

In an aspect, the aromatic-aliphatic polyesters can utilize bio-based aliphatic monomers such as 1,5-PDO, while using FDCA and FDM as aromatic groups. Incumbent monomers such as 1,4-BDO and TPA can be used to provide a fuller range of thermomechanical and degradation properties. Moreover, the disclosed polymers are believed to improve processability through higher melt strength, another drawback in the implementation of aliphatic-aromatic type polyesters, and barrier properties to prevent food spoilage.

Monomer Components

In one aspect, the disclosure relates to monomer components that are biomass-based and that can be used in the disclosed methods to make a biomass-based polyester. In a further aspect, the disclosure relates to polyester materials including biomass-based repeating units, i.e., residues derived from monomer components that are biomass-based that can be used in the disclosed methods to make a biomass-based polyester. In various aspects, the disclosed monomers used in the preparation of the disclosed biomass-based polyester materials can refer to a first monomer component including at least one diol and a second monomer component including at least one dicarboxylic acid. In a further aspect, the disclosed biomass-based polyester material includes repeating units, i.e., residues, derived from a first monomer component and a second monomer component. It is understood that the first monomer component can refer to mixtures of one or more diols, e.g., including a first diol component and a second diol component. Similarly, it is understood that the second monomer component can refer to mixtures of one or more dicarboxylic acids, e.g., including a first dicarboxylic acid component and a second dicarboxylic acid component.

In order to achieve both the desired properties and biomass content in the disclosed biomass-based polyester materials, the first monomer component can include only biomass-based diols or a mixture of biomass-based diols and diols that are not biomass-based. Similarly, the second monomer component can include only biomass-based dicarboxylic acids or a mixture of biomass-based dicarboxylic acids and dicarboxylic acids that are not biomass-based. In some circumstances, the first monomer component is biomass-based and the second monomer component is not biomass-based. In some circumstances, the first monomer component is not biomass-based and the second monomer component is biomass-based.

In various aspects, the first monomer component includes only biomass-based diols, whereas the second monomer component includes only dicarboxylic acids that are not biomass-based. In other instances, the first monomer component includes only diols that are not biomass-based, whereas the second monomer component includes only dicarboxylic acids that are biomass-based. In still further instances, the first monomer component includes a mixture of biomass-based diols and diols that are not biomass-based, whereas the second monomer component includes only dicarboxylic acids that are not biomass-based. In yet further instances, the first monomer component includes a mixture of biomass-based diols and diols that are not biomass-based, whereas the second monomer component includes only dicarboxylic acids that are biomass-based. In even further instances, the first monomer component includes a mixture of biomass-based diols and diols that are not biomass-based, whereas the second monomer component includes only dicarboxylic acids that are a mixture of biomass-based dicarboxylic acids and dicarboxylic acids that are not biomass-based. In further instances, the first monomer component includes a mixture of biomass-based diols and diols that are not biomass-based, whereas the second monomer component includes only dicarboxylic acids that are a mixture of biomass-based dicarboxylic acids and dicarboxylic acids that are not biomass-based.

That said, it is understood that the particular selection and combination of biomass-based monomers and monomers that are not biomass-based are determined such that the resulting biomass-based polyester material includes repeating units such that the repeating units are present in the polyester at a desired weight percent composition of biomass-based repeating units as described herein below.

In one aspect, the present disclosure relates to a first monomer component that is a diol that includes one or more biomass-based diol compounds. In some aspects, the first monomer component, i.e., a diol including one or more biomass-based diol compounds, includes a monomer selected from 1,5-pentanediol (1,5-PDO), tetrahydrofurandimethanol (THFDM), furandimethanol (FDM), and combinations thereof. In particular, the diol is 1,5-PDO but minor (e.g., less than 10%, less than 5%, less than 2%, less than 1%) amounts of other monomer(s) can be present. In a further aspect, the first monomer component can include a first diol component and a second diol component, where in an aspect the first diol component is the primary component (e.g., about 80-90%, about 80 to 95%, about 80 to 99%, about 90-95%, about 90-99%) and the second diol component is not the primary unit (e.g., about 10-20%, about 5 to 20%, about 1 to 20%, about 5-10%, about 1-10%). In various aspects, the first diol component can be 1,5-pentanediol (1,5-PDO); and wherein the second diol component is selected from tetrahydrofurandimethanol (THFDM) and furandimethanol (FDM). Additional monomers (e.g., second diol component) that can be present but in minor amounts can be propane diol, butane diol, hexane diol, octane diol, decane diol, dodecane diol and the like.

In one aspect, the present disclosure relates to a second monomer component that is a dicarboxylic acid that includes one or more biomass-based dicarboxylic compounds. In an aspect, the second monomer component, i.e., a dicarboxylic acid including one or more biomass-based dicarboxylic compounds, includes a monomer selected from aliphatic dicarboxylic acid and aromatic dicarboxylic acid, and combinations thereof. The aliphatic dicarboxylic acid can include adipic acid, succinic acid, glutaric acid, azelaic acid, sebacic acid, dodecanedioic acid, and combinations thereof. The aromatic dicarboxylic acid can include terephthalic acid (TPA), furandicarboxylic acid (FDCA), isophthalic acid, napthalene 2,6 dicarboxylic acid, naphthalene 1,4 dicarboxylic acid, biphenyl 4,4 dicarboxylic acid, and more exotic diacids such as benzene dicarboxylic acid, as well as combinations of any of these. In particular aspects, the second monomer component, i.e., a dicarboxylic acid including one or more biomass-based dicarboxylic compounds, includes a monomer selected from TPA, FDCA, adipic acid, and combinations thereof. It should be noted that terephthalic acid and adipic acid can be produced by conventional methods utilizing petroleum-based reactants or starting materials. However, both terephthalic acid and adipic acid can be produced as biomass-based materials as well. In some instances, the second monomer component further includes a monomer component that is not biomass-based. That is, the second monomer can include a first dicarboxylic acid component and a second dicarboxylic acid component in which the first dicarboxylic acid component is biomass-based and the second dicarboxylic acid component is not biomass-based. Alternatively, both the first dicarboxylic acid component and the second dicarboxylic acid component can be biomass-based such as those provided above and herein. In a particular aspect, the second monomer component is not biomass-based and is selected from biphenyl 4,4'-dicarboxylic acid, terephthalic acid (TPA), and combinations thereof. In a further aspect, the first dicarboxylic acid component is biomass-based and selected from terephthalic acid (TPA), furandicarboxylic acid (FDCA), adipic acid, as well as those provided above and combinations of any of these; and the second dicarboxylic acid component is not biomass-based and selected from biphenyl 4,4'-dicarboxylic acid, terephthalic acid (TPA), as well as those provided above and combinations of any of these.

The disclosed first monomer component and second monomer component can be prepared by methods known to the skilled artisan or obtained from a suitable commercial supplier.

In a further example, 5-hydroxymethylfurfural (HMF) is a C6 platform molecule derived from the dehydration of cellulose or carbohydrates, as shown below (Ref. 19). The University of Wisconsin has recently developed a low-cost route to produce HMF from carbohydrates (Ref. 20-22). This technology can be integrated with the production of high fructose corn syrup for low initial capital investment, with the potential for use of glucose as a lower-cost feedstock in the longer term. HMF can also be synthesized directly from cellulose in up to 44% yield using a polar aprotic solvent system (Ref. 23), or integrated with cellulose-to-glucose conversion technologies (Ref. 24).

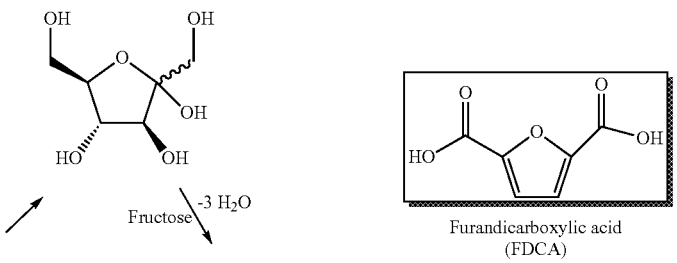

Furandicarboxylic acid (FDCA)

-continued

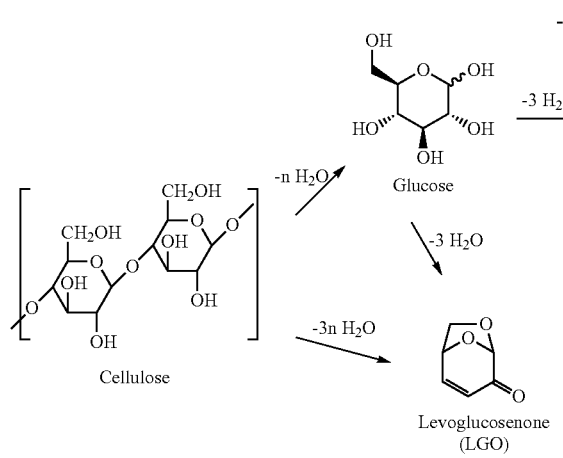

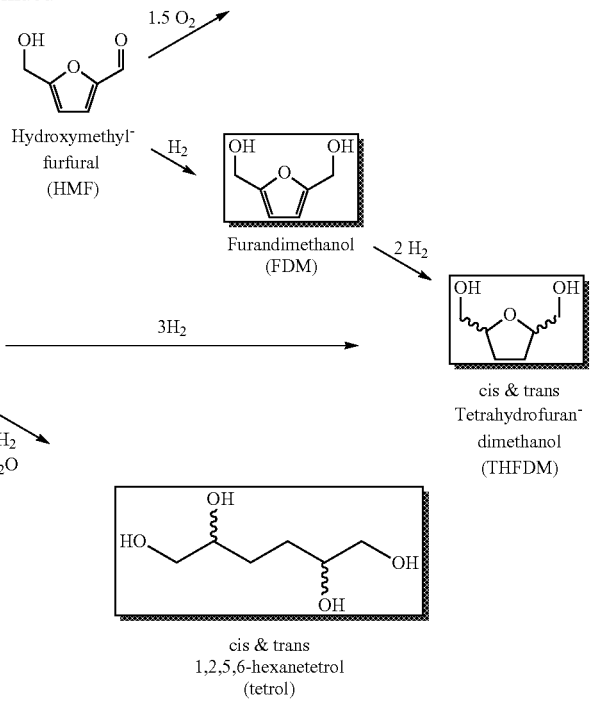

HMF can be partially hydrogenated to FDM over supported metal catalysts or fully hydrogenated to THFDM in >90% yield (Ref. 25). This reaction can be carried out with an inexpensive Ni catalyst. Both THFDM and FDM are α,ω-diols, and can potentially be substituted for existing α,ω-diols in several applications (another hypothesis we will test in this project).[26] Recent patents show that THFDM can be used as a monomer for the synthesis of polyesters and polyethers (see WO2016102361A1 and US20170145153A1). THFDM possesses cis and trans diastereomers; HMF hydrogenation results in high cis/trans ratios (>5) because both C=C bonds of the furan ring are hydrogenated from the same direction (Ref. 29).

HMF can be oxidized to the diacid monomer furandicarboxylic acid (FDCA) in near stoichiometric yields over Pt catalysts (see Ref. 30 and U.S. Pat. No. 9,617,234B1). This process uses a gamma-valerolactone/water solvent system. This solvent system has a high solubility of FDCA, allowing for operation at high reactant concentrations without the need for a homogeneous base catalyst. FDCA can be crystallized from this solvent system at >99% purity. The product FDCA is used as an acid catalyst for the fructose dehydration step, eliminating the use of corrosive acids in this process. Technoeconomic modeling showed that this technology is competitive with existing TPA production processes. FDCA-derived polyetherfuranoate (PEF) is an excellent replacement for PET in the synthesis of polyesters for use in plastic bottles, due to superior oxygen and $CO_2$ diffusion properties (Refs. 32-33). Several routes are currently being developed for production of biomass-based TPA, including: the Thermal Catalytic Biomass Conversion (Bio-TCat™) process being commercialized by Anellotech, the aqueous phase reforming route being commercialized by Virent, and a route being commercialized by Origin Materials.

Levoglucosenone (LGO) was discovered as a biomass pyrolysis product in the 1970s (Ref. 34). The Huber research group has recently demonstrated and patented technology for the production of LGO from cellulose in up to 50% yields using polar aprotic solvents and acid catalysts (Refs. 35-36). The startup company Circa has commercialized the Furacell™ process (50 tons/year) to produce LGO and Cyrene (dihydrolevoglucosenone) from woody biomass (Ref. 37). It has been previously shown that LGO can be converted in 90% yield to 1,2,5,6-hexanetetrol (tetrol), a symmetric polyol with terminal vicinal hydroxyl groups which could be used as a cross-linker in polyesters (Ref. 39). Archer Daniels Midland has a 2017 US patent application showing that tetrol can be produced in up to 50% yields from glucose, requiring a complex separation from the byproduct polyols (See WO2015156802A1). It has also been shown that LGO can be converted to THFDM with up to 70% selectivity, where a 1:1 THFDM cis/trans ratio can be produced in contrast to the route from HMF (Ref. 41), which could be used to tune the physico-chemical properties of the disclosed biomass-based polyester materials derived from the monomers described herein.

C. BIOMASS-BASED POLYESTERS

In various aspects, the present disclosure pertains to biomass-based polyester material made by a disclosed method of making a biomass-based polyester. In various further aspects, the present disclosure pertains to biomass-based polyester materials including repeating units derived from a first monomer component including at least one diol and repeating units derived from a second monomer component including at least one dicarboxylic acid component. In a particular aspect, the ratio of the diol and the dicarboxylic acid component is about 1.1:1 to about 1:1.1. In an aspect, the repeating units derived from the first monomer component are present in an amount of about 25 mol % to about 75 mol %, about 40 mol % to about 60 mol %, about 45 mol % to about 55 mol %, or about 50 mol %. In an aspect, within the diacid monomers, the ratio of the aromatic diacid to the aliphatic diacid can such that the diacid monomer is about 50 mol % to about 85 mol % aromatic diacid, about 60 mol % to about 85 mol % aromatic diacid, about 60 mol % to about 80 mol % aromatic diacid, about 65 mol % to about 80 mol % aromatic diacid, about 70 mol % to about 80 mol % aromatic diacid. In an aspect, the repeating units derived from the second monomer component are present in an amount of from about 25 mol % to about 75 mol %, about 40 mol % to about 60 mol %, about 45 mol % to about 55 mol %, or about 50 mol %. In an aspect, the ratio of the first monomer to the second monomer, on a molar basis, is from about 1.5:1 to about 1:1.5 or about 1.1:1 to about 1:1.1. In an aspect, the mol % is based on the total all repeating units derived from the first monomer component and the repeating units derived from the second monomer component. In an aspect, the repeating units are derived from at least one biomass-based monomer component. In an aspect, the at least one biomass-based monomer component can be the first monomer component, the second monomer component, and combinations thereof. In the foregoing, the ratio of the first monomer to the second monomer, on a molar basis, is from about 1.1:1 to about 1:1.1.

In various aspects, the disclosed biomass-based polyester materials include repeating units derived from biomass-based monomer components, i.e., the first monomer component and/or second monomer component, such that the biomass-based wt % content, based on the weight of the polyester, of the repeating units from about 50 wt % to about 100 wt %; about 55 wt % to about 100 wt %; about 60 wt % to about 100 wt %; about 65 wt % to about 100 wt %; about 70 wt % to about 100 wt %; about 75 wt % to about 100 wt %; about 80 wt % to about 100 wt %; about 85 wt % to about 100 wt %; about 90 wt % to about 100 wt %; about 95 wt % to about 100 wt %; or any wt % range within any of the foregoing wt % ranges; or any wt % value or combination of values within any of the foregoing wt % ranges. In a further aspect, the disclosed biomass-based polyester materials include repeating units derived from biomass-based monomer components, i.e., the first monomer component and/or second monomer component, such that the biomass-based wt % content, based on the weight of the polyester, of the repeating units from at least 10%, at least 20 wt %, at least 30 wt %, at least 40 wt %, at least 50 wt %, at least 60 wt %, at least 70 wt %, at least 80 wt %, at least 90 wt %, at least 95 wt %, at least 96 wt %, at least 97 wt %, at least 98 wt %, at least 99 wt %, at least 99.5 wt %, at least 99.9 wt %, at least 99.99 wt %, or 100 wt %.

In some instances, the disclosed biomass-based polyester materials are biodegradeable, i.e., show improved biodegradeability compared to conventional polyesters or other conventional polymers such as polyolefins. Biodegradation generally leads to decomposition of the disclosed polyester materials in an appropriate and demonstrable period of time. The degradation can take place by an enzymatic, hydrolytic, or oxidative route, and/or via exposure to electromagnetic radiation, such as UV radiation, and can mostly be brought about predominantly via exposure to microorganisms, such as bacteria, yeasts, fungae, and algae. Biodegradability can be quantified use of standard method. In some aspects, the disclosed polyester material has a biodegradability of at least 10%, at least 20%, at least 30%, at least 40%, at least 50%, at least 60%, at least 70%, at least 80%, at least 90%, at least 95%, at least 96%, at least 97%, at least 98%, at least 99%, at least 99.5%, at least 99.9%, at least 99.99%, or 100%. By way of example, biodegradable and biodegradability can be as defined and determined based on ASTM D5338-15 (Standard Test Method for Determining Aerobic Biodegradation of Plastic Materials Under Controlled Composting Conditions, Incorporating Thermophilic Temperatures). Other methods for determining biodegradability are described by way of example in DIN EN 13432 and ASTM D6400-4

In further aspects, the disclosed biomass-based polyester materials have improved thermal and/or mechanical properties compared currently available biomass-based polyester materials and are suitable as replacements, in whole or in part, for conventional LDPE in packaging applications.

In various aspects, the disclosed biomass-based polyester material can be a semi-crystalline biomass-based polyester material. In other aspects, the disclosed biomass-based polyester material can be substantially or essentially non-crystalline.

In a further aspect, the disclosed biomass-based polyester material can have a molecular weight of from about 60 kDa to about 300 kDa, about 70 kDa to about 300 kDa, about 80 kDa to about 200 kDa, about 90 kDa to about 200 kDa; or a molecular weight range within any of the foregoing ranges; or a molecular weight value within any of the foregoing ranges. In a still further aspect, the disclosed biomass-based polyester material can have a molecular weight of greater than or equal to about 60 kDa; about 70 kDa; about 75 kDa; about 80 kDa; about 85 kDa; about 90 kDa; about 95 kDa; or about 100 kDa.

In various aspects, the disclosed biomass-based polyester material can have a tensile modulus of from about 90 MPa to about 500 mPa; about 100 MPa to about 500 mPa; about 200 MPa to about 500 MPa; or tensile modulus range within any of the foregoing ranges; or a tensile modulus value within any of the foregoing ranges. In a still further aspect, the disclosed biomass-based polyester material can have a tensile modulus of greater than about 200 MPa.

In a further aspect, the disclosed biomass-based polyester material is semi-crystalline and can have a tensile modulus of from about 90 MPa to about 500 mPa; about 100 MPa to about 500 MPa; about 200 MPa to about 500 MPa; or tensile modulus range within any of the foregoing ranges; or a tensile modulus value within any of the foregoing ranges. In a still further aspect, the disclosed biomass-based polyester material is semi-crystalline and can have a tensile modulus of greater than about 200 MPa.

In various aspects, the disclosed biomass-based polyester material can have a melting temperature of from about 60° C. to about 250° C. In a further aspect, the disclosed biomass-based polyester material can have a melting temperature of from about 60° C. to about 110° C. In some instances, the disclosed biomass-based polyester material can have repeating units including a diol such as terephthalic acid, and have a melting temperature of from about 60° C. to about 110° C. In a still further aspect, the disclosed biomass-based polyester material can have a melting temperature of from about 60° C. to 140° C., about 60° C. to 130° C. and in some stances about 145° C. to about 250° C. In some instances, the disclosed biomass-based polyester material can have repeating units including a diol such as FDCA, and have a melting temperature of from about 145° C. to about 250° C. In a yet further aspect, the disclosed biomass-based polyester material can have a melting temperature of from about 85° C. to about 125° C. In an even further aspect, the disclosed biomass-based polyester material can have a melting temperature of from about 90° C. to about 115° C.

In a further aspect, the disclosed biomass-based polyester material is semi-crystalline and can have a melting temperature of from about 60° C. to about 250° C. In a further aspect, the disclosed biomass-based polyester material can have a melting temperature of from about 60° C. to about 110° C. In some instances, the disclosed biomass-based polyester material can have repeating units including a diol such as terephthalic acid, and have a melting temperature of from about 60° C. to about 110° C. In a still further aspect, the disclosed biomass-based polyester material is semi-crystalline and can have a melting temperature of from about 145° C. to about 250° C. In some instances, the disclosed biomass-based polyester material can have repeating units including a diol such as FDCA, and have a melting temperature of from about 145° C. to about 250° C. In a yet further aspect, the disclosed biomass-based polyester material is semi-crystalline and can have a melting temperature of from about 85° C. to about 125° C. In an even further aspect, the disclosed biomass-based polyester material is semi-crystalline and can have a melting temperature of from about 90° C. to about 115° C.

In various aspects, the disclosed biomass-based polyester material can have a glass transition temperature of less than or equal to about 0° C.; less than or equal to about –10° C.; less than or equal to about –15° C.; less than or equal to about –20° C.; less than or equal to about –25° C.; less than or equal to about –30° C.; or a glass transition temperature range within any of the foregoing ranges or where the these can be up to about –50° C. or about –100° C.

In various aspects, the disclosed biomass-based polyester material has a structure given by one of the following formulas:

based polyesters include homopolymers and copolymers of disclosed polyesters. The copolymers may be copolymers utilizing only other biomass-based, biogradeable polymers or blocks. However, it is contemplated the disclosed biomass-based polyesters can include copolymers including blocks or units including the disclosed biomass-based polyesters with blocks or units derived from conventional materials or monomers, e.g., blocks or units including conventional polyesters or conventional polyester copolymers such as polyethylene terephthalate glycol-modified (PETG), wherein cyclohexane dimethanol is added to the polymer backbone in place of ethylene glycol, or polyethylene terephthalate isophthalic acid-modified, wherein isophthalic acid replaces some of the linkage of terephthalate units, or bi-axially oriented PET (BOPET), or oriented PET (OPET), and the like.

In various aspects, the present disclosure pertains to polymer compositions including one or more disclosed biomass-based polyesters, and optionally one or more conventional polyester or other conventional polymers, such as

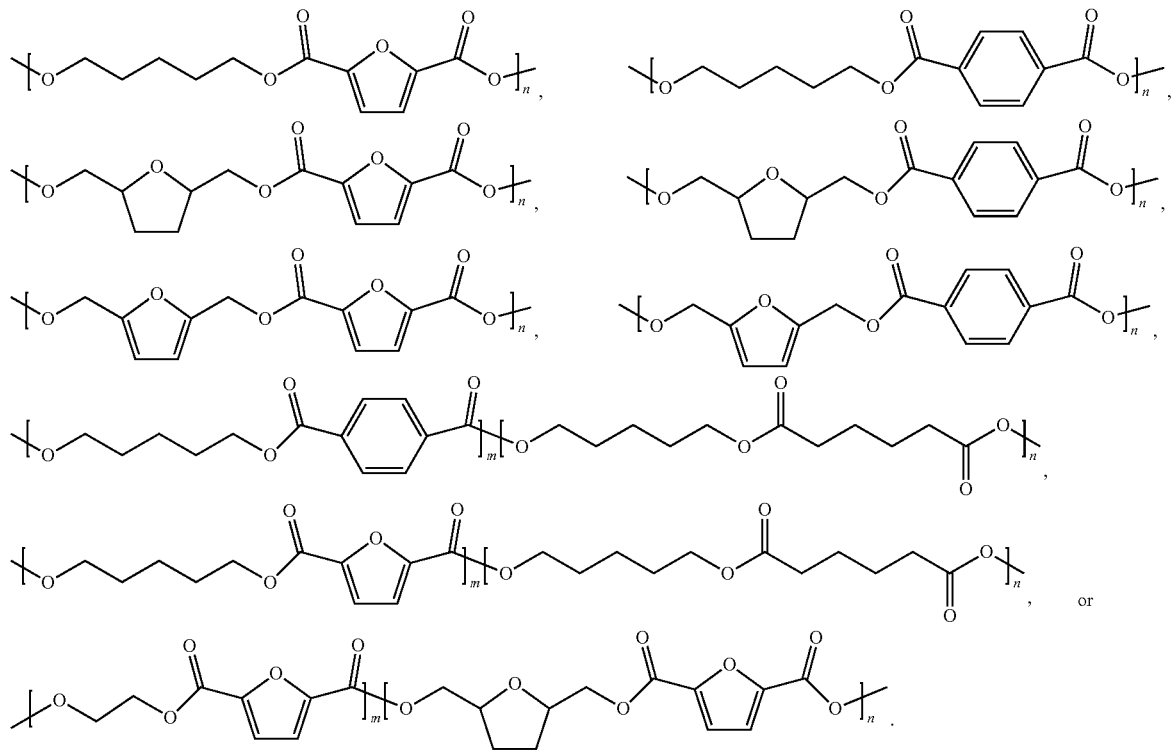

In various aspects, the disclosed biomass-based polyester material has a structure given by the formula:

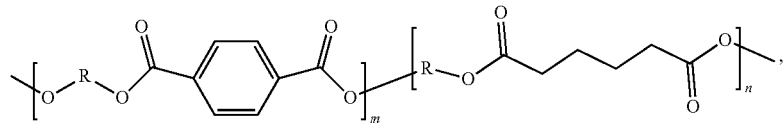

wherein R is a C4-C5 aliphatic chain.

The disclosed biomass-based polyesters can exist both as an amorphous and as a semi-crystalline polymer. In the context of the present disclosure, the disclosed biomass-polyesters (a conventional polyester different from disclosed biomass-based polyesters), polyamides, polyolefins or vinyl polymers, as well as other additives such as metal compounds, glass compounds, fibers, paper, minerals, wood or wood compounds such as lignin, cellulose or hemi-cellulose, and starch and derivatives thereof. In some instances the disclosed polymer compositions include other substances or additives, such as plasticizers, mineral or organic fillers, oxygen scavengers, compatibilizers, adhesives or inks.

In a further aspect, the disclosed polymer compositions including one or more disclosed biomass-based polyesters can further include a conventional polymer or polyester in a polymer blend. The further conventional polyester can be a polytrimethylene terephthalate (PTT), polybutylene terephthalate (PBT), polyethylene isosorbide terephthalate (PEIT), polylactic acid (PLA), poly(L-lactic acid) (PLLA), poly(D-lactic acid) (PDLA), poly(D,L-lactic acid) (PDLLA), PLA stereocomplex (scPLA), polyglycolic acid (PGA), polyhydroxyalkanoate (PHA), poly(3-hydroxybutyrate) (P(3HB)/PHB), poly(3-hydroxyvalerate) (P(3HV)/PHV), poly(3-hydroxyhexanoate) (P(3HHx)), poly(3-hydroxyoctanoate) (P(3HO)), poly(3-hydroxydecanoate) (P(3HD)), Poly(3-hydroxybutyrate-co-3-hydroxyvalerate) (P(3HB-co-3HV)/PHBV), poly(3-hydroxybutyrate-co-3-hydroxyhexanoate) (P(3HB-co-3HHx)/(PHBHHx)), poly(3-hydroxybutyrate-co-5-hydroxyvalerate) (PHB5HV), poly(3-hydroxybutyrate-co-3-hydroxypropionate) (PHB3HP), polyhydroxybutyrate-co-hydroxyoctonoate (PHBO), polyhydroxybutyrate-co-hydroxyoctadecanoate (PHBOd), poly(3-hydroxybutyrate-co-3-hydroxyvalerate-co-4-hydroxybutyrate) (P(3HB-co-3HV-co-4HB)), polybutylene succinate (PBS), polybutylene succinate adipate (PBSA), polybutylene adipate terephthalate (PBAT), polyethylene furanoate (PEF), polycaprolactone (PCL), poly(ethylene adipate) (PEA), polyethylene naphthalate (PEN), polycyclohexylenedimethylene terephthalate (PCT) and blends/mixtures of these materials.

In a further aspect, the disclosed polymer compositions including one or more disclosed biomass-based polyesters can include a conventional polyamide in a polymer blend. The further conventional amide can be polyamide such as a polyamide-6 or poly(β-caprolactam) or polycaproamide (PA6), polyamide-6,6 or poly(hexamethylene adipamide) (PA6,6), poly(11-aminoundecanoamide) (PA11), polydodecanolactam (PA12), poly(tetramethylene adipamide) (PA4,6), poly(pentamethylene sebacamide) (PA5,10), poly(hexamethylene azelaamide) (PA6,9), poly(hexamethylene sebacamide) (PA6,10), poly(hexamethylene dodecanoamide) (PA6,12), poly(m-xylylene adipamide) (PAMXD6), polyhexamethylene adipamide/polyhexamethyleneterephtalamide copolymer (PA66/6T), polyhexamethylene adipamide/polyhexamethyleneisophtalamide copolymer (PA66/6I) and blends/mixtures of these materials.

In a further aspect, the disclosed polymer compositions including one or more disclosed biomass-based polyesters can include a conventional vinyl polymer in a polymer blend. It is understood that a vinyl polymer is a polymer made from vinyl monomers, small molecules containing carbon-carbon double bonds. Exemplary, but non-limiting examples of suitable vinyl polymers include polyethylene (PE), polypropylene (PP), polystyrene (PS), polyvinyl chloride (PVC), polyvinylidene chloride (PVdC), ethylene vinyl acetate (EVA), ethylene vinyl alcohol (EVOH), polyvinyl alcohol (PVOH) and blends/mixtures of these materials.

Moreover, the disclosed polymer compositions may further include one or more additive as disclosed herein below including, but not limited to, an oxygen scavenging material, a colorant, a filler, and the like.

In various aspects, the disclosed biomass-based polyester can be formed into a masterbatch including one or more additional polymers, including conventional polymers, and an additive such as one or more colorant, a dye, a pigment, a nucleation agent, a mold release agent, a fiber, including combinations of organic and inorganic fillers, heat stabilizer, lubricant, and the like. The masterbatch can be formulated including relative amounts of the various components that are useful in an extrusion or injection molding process.

D. METHODS OF MAKING THE DISCLOSED BIOMASS-BASED POLYESTERS

In various aspects, the present disclosure pertains to methods of making a biomass-based polyester material, the method including the step of polycondensation of a first monomer component including at least one diol and a second monomer component including at least one dicarboxylic acid component, thereby forming the biomass-based polyester material; wherein polycondensation is carried out in the presence of a catalyst; and wherein the first monomer component and/or the second monomer component include at least one biomass-based monomer component.

As disclosed in a specific example herein below, the disclosed method can include a reaction, e.g., a polycondensation, carried out using as reactants one or more diol components and one or more dicarboxylic acid components, which are charged to a glass reactor. The polycondensation reaction can be carried via an initial step (esterification) and a second step (polycondensation), all of which can occur in the same reactor vessel with suitable switching components and assemblies. For example, in the initial step, a suitable diol, e.g., 1,5 pentane diol, adipic acid, and terephthalic acid are charged to a reactor vessel, e.g., a stainless steel, a glass or a glass-lined reactor vessel, in suitable proportions provided herein throughout, followed by addition of a suitable amount of a suitable polyester polycondensation catalyst, e.g., oxide, alkoxide and acetate of titanium, and rare earth based catalysts, etc., in particular, titanium (IV) butoxide (TBOT), titanium (IV) isopropoxide, lanthanum (III) acetylacetonate and the like, and the temperature is raised to a suitable temperature, e.g. about 150° C. to about 250° C., about over a suitable period time, e.g., about 1 minute to about 3 hours, under a flow of a suitable inert gas, e.g., nitrogen, with suitable mixing. The reaction is allowed to proceed until a suitable extent of reaction is achieved, e.g., until at least about 50% to about 95% of the theoretical water is distilled for the esterification step. During the initial step, the reactor vessel is allowed to vent to the atmosphere, e.g., venting inert gas from the inert gas flow, as necessary during this step, e.g., via a mineral oil bubbler apparatus assembly. The second step is carried out under vacuum and is initiated by optional addition of further catalyst, e.g., via a pressure equalizing funnel, and pressure adjustment to a suitable pressure, e.g., from about 25 Pa to about 500 Pa, over a suitable period of time, e.g., from about 1 minute to about 6 hours, while maintaining the temperature from the initial step. Following the foregoing, the temperature is gradually raised to a suitable temperature, e.g., a temperature that is greater than the temperature in the initial step by about 10° C. to about 150° C., and the reaction allowed to proceed for a suitable period of time, e.g., until an observable, desired endpoint is reached such as a suitable viscosity can be observed qualitatively or measured quantitatively or via spectroscopic analysis that the substantially complete utilization of a reactant is determined or formation of the desired polyester product determined.

In a particular example of the disclosed method, a suitable diol, e.g., 1,5 pentane diol, adipic acid, and terephthalic acid are charged to a 0.5 L or 1 L glass reactor in the proportions provided herein below in examples. All components are charged into the reactor vessel. The glass reactor is placed in a heating mantle and sealed with attachments for overhead agitation, inert gas flow, vacuum distillation, and thermometer. Initially, the reactor is set to connect the mineral oil bubbler. The temperature is raised to 175° C. under nitrogen with overhead mixing. During the esterification step, the reaction temperature increases from 175° C. to 230° C. slowly. The reaction is allowed to proceed until >90% of the theoretical water is distilled for the esterification step. At that time, the reactor is set to connect vacuum distillation. The pressure is reduced to 0.5 mbar to initiate polycondensation reaction. The polycondensation temperature is increased from 230° C. to 250° C. with increasement of 5° C./30 mins and the reaction is allowed to proceed until max viscosity or molecular weight is achieved.

The catalyst used can be determined based on a number of considerations, such as efficiency, cost, and minimal potential for toxic by-products. For example, a catalyst used in the foregoing method can be generally a tin catalyst, an antimony catalyst, a cobalt catalyst, a lead catalyst, a zinc catalyst, an aluminum catalyst, a magnesium catalyst, or a titanium catalyst, e.g., tetrabutoxy titanium (IV), zinc acetate and magnesium acetate. In other aspects, one catalyst can be used in the initial step, e.g., an ester interchange catalyst such as zinc acetate, manganese acetate, calcium acetate, cobalt acetate and titanium tetraisopropoxide; and a second catalyst can be used in the second step, e.g., a polycondenstation catalyst such antimony trioxide, germanium dioxide, mixtures of these two, titanium alkoxides, lead oxides and zinc.

However, in some instances, in may be particularly desirable to use a titanium catalyst, such as titanium isopropoxide, over other catalysts used in polycondensation reactions, e.g., tin dioctanate, is that residual amounts of the catalyst or a product formed from the catalyst can be retained are toxic. The use of a titanium catalyst can mitigate or minimize the presence of residual catalyst materials or formation of a product from the catalyst that may be toxic. This can be particularly important in the case of the disclosed biomass-based polyesters which are desired to be biodegradable since they can pass directly into the environment without release of more toxic components that may be associated with non-titanium catalysts.

The skilled artisan can adjust the foregoing reaction method as required based on the particular diol(s) and dicarboxylic acid(s) utilized as reactants, as well as desired properties of the polyester formed. That is, the reaction times, pressures, temperatures, inert gas used, flow rate of the inert gas, specific catalyst, and ratios or amounts of the various reactants can be optimized as required.

Moreover, as required, the foregoing reaction can further include as deemed optimal or necessary one or more chain extenders, such as, but not limited to, a diisocyanate, a dianhydride, or combinations thereof.

The diisocyante can be an aliphatic diisocyanate, an aromatic diisocyanate, or combinations thereof. Exemplary, but non-limiting, aromatic diisocyanates include methylene diphenyl diisocyanate, m-phenylene diisocyanate, p-phenylene diisocyanate, polymethylene polyphenyl polyisocyanates, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl) methane, bis(3-methyl-4-isocyanatophenyl) methane, 4,4'-diphenylpropane diisocyanate and combinations thereof. Exemplary, but non-limiting, aliphatic diisocyanates can be linear or branched alkylene diisocyanates or cycloalkylene diisocyanates having from 2 to 20 carbon atoms, or in some instances from 3 to 12 carbon atoms, such as hexamethylene 1,6-diisocyanate, isophorone diisocyanate, or methylenebis(4-isocyanatocyclohexane). A chain extender can be used in an amount of up to about 5% by weight, based on total weight, of target reactive groups.

In various aspects, the dianhydride can be a tetracarboxylic dianhydride such as a pyromellitic dianhydride, benzophenone-3,3',4,4'-tetracarboxylic dianhydride, biphenyl-3,3',4,4'-tetracarboxylic dianhydride, biphenylether-3,3',4,4'-tetracarboxylic dianhydride and diphenylsulfone-3,3',4,4'-tetracarboxylic dianhydride. In a particular aspect, the dianhydride can be pyrometallic dianhydride (PMDA).

E. ADDITIVES

In various aspects, the present disclosure pertains to polymer compositions including the disclosed biomass-based polyesters and optionally one or more conventional polyester or other suitable polymers, and further including one or more additives including, but not limited to, an oxygen scavenging material, a colorant, a filler, and others as disclosed herein below.

In some aspects, a disclosed polymer composition includes one or more oxygen scavenging material. A broad variety of metallic and organic compounds are effective in providing the oxygen scavenging effect, and an appropriate oxygen scavenging material may be selected based on cost and compatibility with the particular polymer composition. For example, a oxygen scavenging material can include a transition metal or a complex of metals selected from the first, second and third transition series of the periodic table, such as iron, cobalt, nickel, ruthenium, rhodium, palladium, osmium, iridium, and platinum. In another preferred embodiment, the metal compound includes copper, manganese, or zinc. Suitable oxygen scavenging materials for use in this invention include: aluminum powder; aluminum carbide; aluminum chloride; cobalt powder; cobalt oxide; cobalt chloride; antimony powder; antimony oxide; antimony tri-acetate; antimony chloride III; antimony chloride V; iron; electrolytic iron; iron oxide; platinum; platinum on alumina; palladium; palladium on alumina; ruthenium; rhodium; copper; copper oxide; nickel, and mixed metal nanoparticles (e.g., cobalt iron oxide nanoparticles). Suitable nanoparticles have an average particle size of less than about 200 nm, less than about 100 nm, and between 5 and 50 nm. One skilled in the art can determine without much difficulty which concentration is appropriate in each blend, but in general it will be a range of 50-10,000 ppm by weight, and more preferably 50-1,000 ppm. The upper limit is dictated by factors such as economy, toxicity, clarity and color.

In some aspects, a disclosed biomass-based polyester or a disclosed polymer composition including a disclosed biomass-based polyester can further include an additive such as metal compounds, mineral compounds, glass compounds, natural or synthetic fibers, paper, wood, wood compounds as lignin, cellulose or hemi-cellulose, starch, and/or derivatives thereof, in amounts as suitable for the end use of the article as determined by the skilled artisan. That is, such further components can be added in an amount effective to obtain a desired tensile strength, melt flow index, and the like. For example, it may be suitable to add such additional materials in an amount of from about 5% to about 45% by weight, from about 10% to about 35% by weight, and from about 25% to about 45% by weight.

In some aspects, a disclosed biomass-based polyester or a disclosed polymer composition including a disclosed biomass-based polyester can further include an additive such as a fiber, e.g., added in an amount by weight of from about 55% to 95%, 60% to 90%, or about 65% to 90%. Exemplary fibers are selected from the group consisting of carbon fibers, flax fibers, hemp fibers, wood fibers, paper fibers, straw fibers, jute fibers, cotton fibers, viscose fibers, glass fibers, metal fibers, aramid fibers, boron fibers, ceramic fibers, liquid crystal polymer fibers, polyester fibers and mixture(s) thereof. In further instances, a disclosed article includes cotton fibers and/or viscose fibers and/or nylon fibers, particularly if the disclosed biomass-based polyester or a disclosed polymer composition including a disclosed biomass-based polyester will be used in the manufacture of textiles, fabrics, rugs and carpets.

In various aspects, a disclosed biomass-based polyester or a disclosed polymer composition including a disclosed biomass-based polyester can further include an additive such as at least one metal compound, including, but not limited to, metal compounds selected from aluminum such as foil, aluminum oxide, titanium, titanium oxide, nickel and chrome. For instance, the metal compound can be present in an amount by weight from about 1% to 70%, about 2% to 50%, or about 2% to 40%.

In a further aspect, a disclosed biomass-based polyester or a disclosed polymer composition including a disclosed biomass-based polyester can further include an additive such as at least one mineral compound, including, but not limited to, silica or silicon dioxide, glass, or mica.

In a further aspect, a disclosed biomass-based polyester or a disclosed polymer composition including a disclosed biomass-based polyester can further include an additive such as a material selected from the group of consisting aluminum, cellulose, starch and combinations thereof.

In a further aspect, a disclosed biomass-based polyester or a disclosed polymer composition including a disclosed biomass-based polyester can further include an additive such as one or more heat stabilizer, nucleation agent, mold-release agent, lubricant, and filler. Further specific examples of additives include, plasticizers (plastificizers), such as citric esters (in particular tributyl acetylcitrate), glycerol esters, such as triacetylglycerol, or ethylene glycol derivatives; surfactants, such as polysorbates, palmitates, or laurates; waxes, such as beeswax or beeswax ester; antistatic agents; UV absorbers; UV stabilizers; antifogging agents, or dyes. The concentrations used of the additives are from 0 to 5% by weight, in particular from 0.1 to 2% by weight, based on the polyesters of the invention. The amounts included of plasticizers in the polyesters of the invention can be from 0.1 to 10% by weight of all components in the composition. Examples of heat stabilizers include primary antioxidants of the hindered phenol family and secondary aromatic amines, secondary antioxidants (thioethers, thioesters, as well as phosphites). Exemplary suitable mold-release agents include silicones, and in particular silicone oils. Examples of suitable lubricants, include, but not limited to, stearates such as calcium stearate or waxes of paraffin, polyethylene (modified or not), ester and montanic acid. Various fillers have been disclosed herein above, above exemplary, but non-limiting, mention may be made of fillers such as PTFE, PPS or PA powder or inorganic fillers such as talc, clay, calcium carbonate, beads, including both hollow and solid beads, wollastonite, barium sulphate, kaolin, graphite, mica, silica and silicates. In some aspects, an inorganic or organic pigments (soluble or insoluble) that can be used is titanium dioxide, molecules with an azo group, the phthalocyanine and anthraquinone family and carbon black. Useful nucleation agents include inorganic nucleation agents such as talc and silica, organic nucleation agents such as high-molecular-weight carboxylic acids, or alkaline metal salts such as sodium benzoate.

In a further aspect, the present disclosure pertains to polyester and polymer compositions including the disclosed biomass-based polyesters and optionally one or more conventional polyester or other suitable polymers, and further including one or more additives such as a filler. In one aspect, the filler can be present in an amount of from 1 to 80% by weight, based on the total weight of components in the polyester or polymer composition, of an organic filler selected from native or plastified starch, natural fibers, wood flour, and/or of an inorganic filler selected chalk, precipitated calcium carbonate, graphite, gypsum, conductive carbon black, iron oxide, calcium chloride, dolomite, kaolin, silicon dioxide (quartz), sodium carbonate, titanium dioxide, silicate, wollastonite, mica, montmorillonite, talc, glass fibers, and mineral fibers is added. Starch and amylose can be native, i.e., not thermoplastified, or can have been thermoplastified using plasticizers such as glycerol or sorbitol. Examples of natural fibers are cellulose fibers, hemp fibers, sisal, kenaf, jute, flax, abacca, coconut fiber, or Cordenka fibers.

Fibrous fillers can include glass fibers, carbon fibers, aramid fibers, potassium titanate fibers, and natural fibers, particular preference being given to glass fibers in the form of E glass. These can be used in the form of rovings or in particular in the form of chopped glass, in the forms commercially available. The diameter of these fibers is generally from 3 to 30 µm, preferably from 6 to 20 µm, and particularly preferably from 8 to 15 µm. The length of the fiber in the compounded material is generally from 20 µm to 1000 µm, preferably from 180 to 500 µm, and particularly preferably from 200 to 400 µm.

F. ARTICLES

In various aspects, the present disclosure pertains to articles including a disclosed biomass-based polyester material, a biomass-based polyester material made by a disclosed method, or a disclosed polymer composition.

That is, in various aspects, the disclosed biomass-based polyester materials, a biomass-based polyester material made by the disclosed methods, or the disclosed polymer compositions can be used to manufacture an article or a component used in the manufacture of an article including more than one component. The disclosed articles can be any article in which conventional polyesters are used, including, but not limited to, films, including layered or laminated films; shaped or molded components or articles, e.g., injection molded components or articles; packaging materials and components; building materials and components; carpet; textile; garment; article of apparel; and the like. As discussed herein above, a disclosed polyester composition includes: (a) one or more disclosed biomass-based polyester materials or a biomass-based polyester material made by a disclosed method; and (b) an additional polyester material that is substantially not a biomass-based polyester material. As discussed herein above, a disclosed are polymer compositions including polymer composition including a disclosed biomass-based polyester material or a biomass-based polyester material made by a disclosed method, and one or more non-polyester polymers, i.e., a blend of one or more disclosed biomass-based polyesters, or can be a blend of one or more disclosed biomass-based polyesters and one or more conventional polymer. For instance, a disclosed polymer composition including a blend of polymers as disclosed herein can be mixed altogether to form a homogeneous or substantially homogeneous mass, including blends produced by extrusion or injection molding.

The disclosed articles may be constituted of several layers and/or parts containing different components. Alternatively, the disclosed article may be a composite article constituted of natural or synthetic fibers impregnated with a disclosed biomass-based polyester, such as an article that is glass reinforced and used in the building industry for facades, porticos, planters, balustrades, etc.

The disclosed articles including disclosed biomass-based polyesters or disclosed polymer compositions including disclosed biomass-based polyesters can be plastic sheet(s), tube(s), rod(s), profile(s), shape(s), massive block(s), fiber(s), and the like. A disclosed article including layers or that is a laminate having different layers/parts of a disclosed biomass-based polyester can coexist, be adjacent, joined together or imbricated with other conventional materials. The layers may have different length, thickness etc. The layers may overlap entirely, or solely partially. The layers may be bonded with specific adhesive, during the manufacturing, through dedicated processes, and the like. In a particular aspect, one of the layer forms an adhesive between the disclosed biomass-based polyester layer and another layer of the article. Examples of such articles include plastic bottles, food packaging such as trays, plastic blisters, plastic clamshells, and the like. For instance, the disclosed article can be plastic bottles for gaseous liquids wherein nylon-based nanocomposites or EVOH layer(s) are sandwiched between one or more layers including a disclosed biomass-based polyester. In another instance, the disclosed article can be food packaging as trays, wherein a layer of a disclosed biomass-based polyester is used as a welding agent between a tray and a lid that are both constituted of a polyester, which can be a disclosed biomass-based, biogradeable polyester or a blend of polyester materials that includes a disclosed biomass-based, biogradeable polyester.

In some aspects, a disclosed article including a disclosed biomass-based polyesters or disclosed polymer compositions including disclosed biomass-based polyesters can be a carpet material including a fiber formed from a disclosed biomass-based, biogradeable polyester or a blend of polyester materials that includes a disclosed biomass-based, biogradeable polyester. In some instances, the carpet can include a fiber including a disclosed biomass-based polyesters or disclosed polymer compositions including disclosed biomass-based polyesters or a blend of fibers such that at least one fiber includes a disclosed biomass-based polyesters or disclosed polymer compositions including disclosed biomass-based polyesters, such that the foregoing fibers are imbricated or imbricated with additional fibers.

The disclosed articles may be formed with layers or portions of these different materials that are at least partially bonded together. The layers or portions may have different dimensions and may overlap entirely or solely partially. The layers or portions may be bonded with specific adhesive, during the manufacturing, through dedicated processes, etc. For instance, the disclosed article can include a material that has on one side a film or layer or panel that includes a disclosed biomass-based, biogradeable polyester or a blend of polyester materials that includes a disclosed biomass-based, biogradeable polyester and having a second covered with an aluminum layer, that is, a pouch used for food packaging including a disclosed biomass-based, biogradeable polyester or a blend of polyester materials that includes a disclosed biomass-based, biogradeable polyester laminated with aluminum layer or foil. In another aspect, the disclosed article can be a flexible food packaging composed of a film of a disclosed biomass-based, biogradeable polyester or a blend of polyester materials that includes a disclosed biomass-based, biogradeable polyester coated with nanocrystalline cellulose. The disclosed article can also be a component of pharmaceutical packaging including several components including a disclosed biomass-based, biogradeable polyester or a blend of polyester materials that includes a disclosed biomass-based, biogradeable polyester, paper and aluminum.

In some aspects, a disclosed article including a disclosed biomass-based polyesters or disclosed polymer compositions including disclosed biomass-based polyesters is a fiberfill filling material, e.g., a polyester fiberfill. The disclosed articles can be pillows, cushions, furnishing materials, bedding materials, including sleeping bags, mattress pads, quilts and comforters and including duvets, and apparel, including parkas and other insulated articles of apparel, that include the fiberill filling material including a disclosed biomass-based polyesters or disclosed polymer compositions including disclosed biomass-based polyesters.

In a further aspect, the disclosed article is a grocery bag, a garbage bag, a component of food packaging, a component of beverage packaging, a film, a laminate, a textile, a carpet, apparel, or a construction material.

In a further aspect, the disclosed article is a laminate including at least two laminate layers; wherein at least one laminate layer includes a disclosed biomass-based polyester material, a biomass-based polyester material made by a disclosed method, or a disclosed polymer composition.

In a further aspect, the disclosed article is a film including at least two film layers; wherein at least one film layer includes a disclosed biomass-based polyester material, a biomass-based polyester material made by a disclosed method, or a disclosed polymer composition.

In a further aspect, the disclosed article is an injection molded article. In another aspect, the disclosed article is an extrusion molded article. In another aspect, the disclosed article includes a component including a disclosed biomass-based polyester material, a biomass-based polyester material made by a disclosed method, or a disclosed polymer composition.

G. REFERENCES

References are cited herein throughout using the format of reference number(s) enclosed by parentheses corresponding to one or more of the following numbered references. For example, citation of references numbers 1 and 2 immediately herein below would be indicated in the disclosure as (Refs. 1 and 2), or citation of reference numbers 1 to 5 immediately herein below would be indicated in the disclosure as (Refs. 1-5).

Ref. 1. Furfural-Chemical Economics Handbook (IHS Markit). https://ihsmarkit.com/products/furfural-chemical-economics-handbook.html.

Ref 2. Nakagawa, Y.; Tamura, M.; Tomishige, K., *ACS Catalysis* 2013, 3 (12), 2655-2668.

Ref. 3. Brentzel, Z. J.; Barnett, K. J.; Huang, K.; Maravelias, C. T.; Dumesic, J. A.; Huber, G. W., *ChemSusChem* 2017, 10 (7), 1351-1355.

Ref 4. Huang, K.; Brentzel, Z. J.; Barnett, K. J.; Huber, G. W.; Dumesic, J. A.; Maravelias, C. T., *ACS Sustainable Chemistry & Engineering* 2017, 5, 4699-4706

Ref. 5. Huber, G. W.; A., D. J.; Barnett, K. J.; Brentzel, Z. J. Production of 1,5-pentanediol via upgrading of tetrahydrofufuryl alcohol (U.S. Pat. No. 10,183,904B2). 2017.

Ref. 6. Huber, G. W.; Dumesic, J. A.; Barnett, K. J. Production of 1,5-pentanediol via upgrading of tetrahydrofurfuryl alcohol (U.S. Pat. No. 10,077,224B1). 2018.

Ref 7. Barnett, K. J.; McClelland, D. J.; Huber, G. W., *ACS Sustainable Chemistry & Engineering* 2017, 5 (11), 10223-10230.

Ref 8. Li, L.; Barnett, K. J.; McClelland, D. J.; Zhao, D.; Liu, G.; Huber, G. W., *Applied Catalysis B: Environmental* 2019, 245, 62-70.

Ref 9. Huang, K.; Won, W.; Barnett, K. J.; Brentzel, Z. J.; Alonso, D. M.; Huber, G. W.; Dumesic, J. A.; Maravelias, C. T., *Applied Energy* 2018, 213, 585-594.

Ref 10. He, J.; Huang, K.; Barnett, K. J.; Krishna, S. H.; Alonso, D. M.; Brentzel, Z. J.; Burt, S. P.; Walker, T.; Banholzer, W. F.; Maravelias, C. T.; Hermans, I.; Dumesic, J. A.; Huber, G. W., *Faraday Discussions* 2017, 202 (0), 247-267.

Ref 11. Krishna, S. H.; Huang, K.; Barnett, K. J.; He, J.; Maravelias, C. T.; Dumesic, J. A.; Huber, G. W.; De bruyn, M.; Weckhuysen, B. M., *AIChE Journal* 2018, 64 (6), 1910-1922.

Ref. 12. Burt, S. P.; Barnett, K. J.; McClelland, D. J.; Wolf, P.; Dumesic, J. A.; Huber, G. W.; Hermans, I., *Green Chemistry* 2017, 19 (5), 1390-1398.

Ref 13. Kura, A.; Takahashi, S. Polycarbonate-modified acrylic resin, coating, and plastic molding coated with said coating (WO2015045562A1). 2015.

Ref 14. Kusano, K.; Kanamori, Y.; Nakagawa, Y.; Yano, K. Polycarbonate diol and polyurethane using same (US20150291724A1). 2015.

Ref 15. Torgerson, M.; Kaprinidis, N.; Muldoon, D. T.; Bhuta, B. N. Liquid blend comprising 1,4-butanediol and another alcohol or polyol (WO2018187462A1). 2018.

Ref 16. Kondos, C.; Soad, N.; Huang, M.; Lacroix, C.; Kumar, V. Moisture-curable silylated resin derived from polycarbonate diol and coating, sealant and adhesive compositions containing same (WO2017156269A1). 2017.

Ref. 17. Meltzer, D. A. Low Melting Polyurethane Elastomers (US20110112270A1). 2011.

Ref. 18. Nefzger, H.; Barnes, J.-M.; Schmidt, M.; Jens, K. Polyurethane and polyurethane urea elastomers based on polycarbonate polyols (U.S. Pat. No. 8,273,846B2). 2012.

Ref 19. Wang, T.; Nolte, M. W.; Shanks, B. H., *Green Chemistry* 2014, 16 (2), 548-572.

Ref. 20. Motagamwala, A. H.; Huang, K.; Maravelias, C. T.; Dumesic, J. A., *Energy & Environmental Science* 2019.

Ref 21. Dumesic, J. A.; Huber, G. W.; Weingarten, R. Method for selectively preparing 5-hydroxymethylfurfual (HMF) from biomass in polar aprotic solvents (U.S. Pat. No. 9,242,952B2). 2014.

Ref. 22. Dumesic, J. A.; Gallo, J. M. R.; Alonso, D. Method to convert biomass to 5-(hydroxymethyl)-furfural (HMF) and furfural using lactones, furans, and pyrans as solvents (U.S. Pat. No. 8,772,515 B2). 2014.

Ref 23. Weingarten, R.; Rodriguez-Beuerman, A.; Cao, F.; Luterbacher, J. S.; Alonso, D. M.; Dumesic, J. A.; Huber, G. W., *ChemCatChem* 2014, 6 (8), 2229-2234.

Ref. 24. Luterbacher, J. S.; Rand, J. M.; Alonso, D. M.; Han, J.; Youngquist, J. T.; Maravelias, C. T.; Pfleger, B. F.; Dumesic, J. A., *Science* 2014, 343 (6168), 277-280.

Ref. 25. Alamillo, R.; Tucker, M.; Chia, M.; Pagan-Torres, Y.; Dumesic, J., *Green Chemistry* 2012, 14 (5), 1413-1419.

Ref 26. Moreau, C.; Belgacem, M. N.; Gandini, A., *Topics in Catalysis* 2004, 27 (1), 11-30.

Ref. 27. Jeol, S. Polyesters from aromatic carboxylic diacid and 2,5-bis(hydroxymethyl)tetrahydrofuran (WO2016102361A1). 2016.

Ref 28. Jacquel, N.; Degand, G.; Saint-Loup, R. Thermoplastic aromatic polyesters comprising tetrahydrofurandimethanol and furandicarboxylic acid motifs (US20170145153A1). 2017.

Ref 29. Hu, X.; Westerhof, R. J. M.; Wu, L.; Dong, D.; Li, C.-Z., *Green Chemistry* 2015, 17 (1), 219-224.

Ref 30. Motagamwala, A. H.; Won, W.; Sener, C.; Alonso, D. M.; Maravelias, C. T.; Dumesic, J. A., *Science Advances* 2018, 4 (1).

Ref. 31. Dumesic, J. A.; Motagamwala, A. H. Method to produce furandicarboxylic acid (FDCA) from 5-hydroxymethylfurfural (HMF) (U.S. Pat. No. 9,617,234-B1). 2017.

Ref. 32. Burgess, S. K.; Kriegel, R. M.; Koros, W. J., *Macromolecules* 2015, 48 (7), 2184-2193.

Ref. 33. Burgess, S. K.; Karvan, O.; Johnson, J. R.; Kriegel, R. M.; Koros, W. J., *Polymer* 2014, 55 (18), 4748-4756.

Ref. 34. De bruyn, M.; Fan, J.; Budarin, V. L.; Macquarrie, D. J.; Gomez, L. D.; Simister, R.; Farmer, T. J.; Raverty, W. D.; McQueen-Mason, S. J.; Clark, J. H., *Energy & Environmental Science* 2016, 9 (8), 2571-2574.

Ref. 35. Cao, F.; Schwartz, T. J.; McClelland, D. J.; Krishna, S. H.; Dumesic, J. A.; Huber, G. W., *Energy & Environmental Science* 2015, 8 (6), 1808-1815.

Ref. 36. Court, G. R.; Lawrence, C. H.; Raverty, W. D.; Duncan, A. J. Method for converting lignocellulosic materials into useful chemicals. 2012.

Ref. 37. Sherwood, J.; De bruyn, M.; Constantinou, A.; Moity, L.; McElroy, C. R.; Farmer, T. J.; Duncan, T.; Raverty, W.; Hunt, A. J.; Clark, J. H., *Chemical Communications* 2014, 50 (68), 9650-9652.

Ref 38. He, J.; Liu, M.; Huang, K.; Walker, T. W.; Maravelias, C. T.; Dumesic, J. A.; Huber, G. W., *Green Chemistry* 2017, 19 (15), 3642-3653.

Ref 39. Krishna, S. H.; De bruyn, M.; Schmidt, Z. R.; Weckhuysen, B. M.; Dumesic, J. A.; Huber, G. W., *Green Chemistry* 2018, 20 (19), 4557-4565.

Ref 40. Strensrud, K.; Ma, C.-C. Synthesis of R-glucosides, sugar alcohols, reduced sugar alcohols, and furan derivatives of reduced sugar alcohols (patent application). 2017.

Ref. 41. Krishna, S. H.; Assary, R. S.; Rashke, Q. A.; Schmidt, Z. R.; Curtiss, L. A.; Dumesic, J. A.; Huber, G. W., *ACS Catalysis* 2018, 3743-3753.

Ref 42. What Plastics Are Approved for Food Contact Applications?—Custom-Pak, Inc. https://www.custom-pak.com/what-plastics-are-approved-for-food-contact-applications/(accessed Jun. 25, 2019).

Ref 43. Jung, M. R.; Horgen, F. D.; Orski, S. V.; Rodriguez C., V.; Beers, K. L.; Balazs, G. H.; Jones, T. T.; Work, T. M.; Brignac, K. C.; Royer, S.-J.; Hyrenbach, K. D.; Jensen, B. A.; Lynch, J. M., *Marine Pollution Bulletin* 2018, 127, 704-716.

Ref 44. Jambeck, J. R.; Geyer, R.; Wilcox, C.; Siegler, T. R.; Perryman, M.; Andrady, A.; Narayan, R.; Law, K. L., *Science* 2015, 347, 768-771.

Ref 45. Elejalde-Ruiz, A. In *Chicago Tribune*, Chicago, IL, 2015.

Ref 46. Müller, R.-J.; Kleeberg, I.; Deckwer, W.-D., *Journal of Biotechnology* 2001, 86, 87-95.

Ref. 47. Cornell, D. D. In Modern Polyesters: Chemistry and Technology of Polyesters and Copolyesters, Scheirs, J., Long, T. E., Eds. 2004.

Ref 48. Buchanan, C. M., Gardner, Robert M., Wood, Matthew D., White, Alan W., Gedon, Steven C., Barlow, Jr., Fred D. Aliphatic-aromatic copolyesters and cellulose ester/polymer blends (U.S. Pat. No. 5,580,911A). 1996.
Ref 49. Deligio, T., Biodegradable plastic market adds a new player in China: Plastics Technology. In *Plastics Technology,* 2014.
Ref 50. Warzelhan, V.; Schornick, G.; Bruchmann, B.; Seeliger, U.; Yamamoto, M.; Bauer, P. Biodegradable polymers, the production thereof and the use thereof for producing biodegradable moldings (U.S. Pat. No. 6,201, 034B1). 1999.
Ref 51. Witt, U.; Yamamoto, M. Method for the continuous production of biodegradable polyesters (EP2628758A1). 2013.
Ref 52. Lu, J.; Wu, L.; Li, B.-G., *ACS Sustainable Chemistry & Engineering* 2017, 5, 6159-6166.
Ref 53. Bunker, G., Tips and Techniques: How to Downgauge Film Without Losing the 'Feel' of Quality. In *Plastics Technology,* 2011.
Ref 54. Herrera, R.; Franco, L.; Rodríguez-Galán, A.; Puiggali, J., *Journal of Polymer Science Part A: Polymer Chemistry* 2002, 40, 4141-4157.
Ref 55. Witt, U.; Einig, T.; Yamamoto, M.; Kleeberg, I.; Deckwer, W.-D.; Müller, R.-J., *Chemosphere* 2001, 44, 289-299.
Ref 56. Witt, U.; Müller, R.-J.; Deckwer, W.-D., *Journal of environmental polymer degradation* 1997, 5, 81-89.
Ref 57. Artigas, M. V.; Mestrom, L.; De Groot, R.; Philippi, V.; Sanchez, C. G.; Hooghoudt, T., 2013.
Ref 58. Han, L.; Zhu, G.; Zhang, W.; Chen, W., *Journal of Applied Polymer Science* 2009, 113, 1298-1306.
Ref 59. Zhu, C.; Zhang, Z.; Liu, Q.; Wang, Z.; Jin, J., *Journal of Applied Polymer Science* 2003, 90, 982-990.
Ref 60. Peng, S.; Wu, B.; Wu, L.; Li, B.-G.; Dubois, P., *Journal of Applied Polymer Science* 2017, 134.
Ref 61. Hayes, R. A. New amphiphile polycondensates and use of same in combination with polyester or surfaces containing polyester (EP2431456A1). 2011.
Ref 62. Nagarajan, V. Method to accelerate biodegradation of aliphatic-aromatic co-polyesters by enzymatic treatment (US-20050261465A1). 2004.
Ref 63. Desai, N., PEs vs Biodegradable Polymers—Processing Challenges and Constraints. In *Flexible Packaging Magazine,* Troy, M I, 2014.
Ref 64. Pecorini, T. J.; Dobbs, H. E. Polyester having improved crystallization behavior and extrusion blow molded articles made therefrom (U.S. Pat. No. 6,740, 377B2). 2002.
Ref. 65. Carson, W. G.; Lai, C. H.; Memon, N. A. Aromatic polyester melt strength improver (U.S. Pat. No. 5,268, 438A). 1991.
Ref 66. Sublett, B. J. Preparation of branched polyethylene terephthalate (U.S. Pat. No. 5,376,735A). 1993.
Ref. 67. Siracusa, V.; Rocculi, P.; Romani, S.; Rosa, M. D., *Trends in Food Science & Technology* 2008, 19, 634-643.
Ref. 68. Tullo, A. H., Breaking In The New. *In Chemical and Engineering News,* The American Chemical Society: 2011; pp 10-14.
Ref 69. Eastman TRITAN: Independent third-party test results (performance of clear engineered polymers and glass). https://www.eastman.com/Literature_Center/S/SPMBS1584.pdf (accessed Jul. 2, 2019).
Ref. 70. Global PETG Market by Product (Extruded Grade, I. M. G. a. B. M. G., By Application (Sheet & Film, Bottle & Container, Extruded Profile and others), By Region and Key Companies—Industry Segment Outlook, Market Assessment, Competition Scenario, Trends and Forecast 2019-2028 https://market.us/report/polyethylene-terephthalate-glycol-petg-market/(accessed Jul. 10, 2019).
Ref 71. Wang, J.; Mahmud, S.; Zhang, X.; Zhu, J.; Shen, Z.; Liu, X., *ACS Sustainable Chemistry & Engineering* 2019, 7 (6), 6401-6411.
Ref 72. Karayannidis, G. P.; Achilias, D. S., *Macromolecular Materials and Engineering* 2007, 292 (2), 128-146.
Ref 73. Pusztaszeri, S. F. Method for recovery of terephthalic acid from polyester scrap (U.S. Pat. No. 4,355, 175A). 1982.
Ref 74. Karayannidis, G. P.; Chatziavgoustis, A. P.; Achilias, D. S., *Advances in Polymer Technology* 2002, 21 (4), 250-259.
Ref 75. Kosmidis, V. A.; Achilias, D. S.; Karayannidis, G. P., *Macromolecular Materials and Engineering* 2001, 286 (10), 640-647.
Ref 76. Karayannidis, G. P.; Nikolaidis, A. K.; Sideridou, I. D.; Bikiaris, D. N.; Achilias, D. S., *Macromolecular Materials and Engineering* 2006, 291 (11), 1338-1347.
Ref 77. Allen, B.; Breyta, G.; Garcia, J.; Jones, G.; Hedrick, J. Polyester Digestion: VOLCAT https://www.energy.gov/sites/prod/files/2018/10/f56/Robert_Allen_CCE_PanelDay1_0.pdf (accessed May 24, 2019).
Ref 78. Horn, H. W.; Jones, G. O.; Wei, D. S.; Fukushima, K.; Lecuyer, J. M.; Coady, D. J.; Hedrick, J. L.; Rice, J. E., *The Journal of Physical Chemistry A* 2012, 116 (51), 12389-12398.
Ref 79. Zhang, X.; Fevre, M.; Jones, G. O.; Waymouth, R. M., *Chemical Reviews* 2018, 118 (2), 839-885.
Ref 80. Allen, R. D.; Bajjuri, K. M.; Hedrick, J. L.; Breyta, G.; Larson, C. E. Methods and materials for depolymerizing polyesters (U.S. Pat. No. 9,255,194B2). 2016.
Ref 81. Garcia, J. M.; Robertson, M. L., *Science* 2017, 358 (6365), 870-872.
Ref 82. Xu, L.; Stangland, E. E.; Mavrikakis, M., *Journal of Catalysis* 2018, 362, 18-24.
Ref. 83. Plastics Packaging Film and Sheet Manufacturing: Global Markets to 2020. https://www.bccresearch.com/market-research/plastics/plastics-packaging-film-and-sheet-manufacturing.html (accessed Jul. 10, 2019).
Ref 84. Sorenson, W. R. W. R.; Sweeny, W.; Campbell, T. W., 2001, 488.
Ref 85. Tosin, M.; Weber, M.; Siotto, M.; Lott, C.; Degli-Innocenti, F., *Frontiers in Microbiology* 2012, 3 (225).
Ref 86. Standard Test Method for Determining Aerobic Biodegradation of Plastic Materials in the Marine Environment by a Defined Microbial Consortium or Natural Sea Water Inoculum (Active Standard ASTM D6691). American Society for Testing and Materials.
Ref 87. Krishna, S. H.; McClelland, D. J.; Rashke, Q. A.; Dumesic, J. A.; Huber, G. W., *Green Chemistry* 2017, 19 (5), 1278-1285.

I. Various Aspects

Various aspects of the present disclosure are presented below. The disclosure is not limited to these aspects, but these are provided to illustrate some aspects of the disclosure.

Aspect 1. A method of making a biomass-based polyester material, the method comprising the step of polycondensation of a first monomer component comprising at least one diol and a second monomer component comprising at least one dicarboxylic acid component, thereby forming the biomass-based polyester material;

wherein polycondensation is carried out in the presence of a catalyst; and wherein the first monomer component and/or the second monomer component include at least one biomass-based monomer component.

Aspect 2. The method of aspect 1, wherein the first monomer component is present in about 10 parts to about 150 parts on a molar basis.

Aspect 3. The method of aspect 2, wherein the first monomer component is present in about 50 parts to about 150 parts on a molar basis.

Aspect 4. The method of any one of aspects 1-3, wherein the first monomer component comprises a biomass-based monomer component.

Aspect 5. The method of any one of aspects 1-4, wherein the biomass-based monomer is selected from 1,5-pentanediol (1,5-PDO), tetrahydrofurandimethanol (THFDM), furandimethanol (FDM), and combinations thereof, optionally wherein the biomass-based monomer comprises 1,5-pentanediol (1,5-PDO), optionally wherein the biomass-based monomer consists essentially of 1,5-pentanediol (1,5-PDO) (e.g., where less than about 5% of the biomass-based monomer is selection from other monomer (e.g., FDM, THFDM, and the like)).

Aspect 6. The method of any one of aspects 1-5, wherein the first monomer component further comprises a monomer component that is not biomass-based.

Aspect 7. The method of aspect 6, wherein the first monomer component is selected from butanediol, ethylene glycol, propylene glycol, and combinations thereof.

Aspect 8. The method of any one of aspects 1-7, wherein the first monomer component comprises a first diol component and a second diol component.

Aspect 9. The method of aspect 8, wherein the first diol component is present in an amount of about 10 to about 150 parts; wherein the second diol component is present in an amount of about 10 to about 150 parts; wherein the first diol component and the second diol component are present in an aggregate amount of not greater than about 150 parts; and wherein parts are given on a molar basis.

Aspect 10. The method of aspect 8, wherein the first diol component is present in an amount of about 50 to about 100 parts; wherein the second diol component is present in an amount of about 50 to about 100 parts; wherein the first diol component and the second diol component are present in an aggregate amount of not greater than about 150 parts; and wherein parts are given on a molar basis.

Aspect 11. The method of any one of aspects 8-10, wherein the first diol component is 1,5-pentanediol (1,5-PDO); and wherein the second diol component is selected from tetrahydrofurandimethanol (THFDM) and furandimethanol (FDM).

Aspect 12. The method of any one of aspects 1-11, wherein the second monomer component is present in about 10 parts to about 150 parts on a molar basis.

Aspect 13. The method of aspect 12, wherein the second monomer component is present in about 50 parts to about 150 parts on a molar basis.

Aspect 14. The method of any one of aspects 1-13, wherein the second monomer component comprises a biomass-based monomer.

Aspect 15. The method of aspect 14, wherein the second monomer component is selected from terephthalic acid (TPA), furandicarboxylic acid (FDCA), adipic acid, and combinations thereof.

Aspect 16. The method of any one of aspects 1-15, wherein the second monomer component further comprises a monomer component that is not biomass-based.

Aspect 17. The method of aspect 16, wherein the second monomer component is selected from biphenyl 4,4'-dicarboxylic acid, terephthalic acid (TPA), and combinations thereof.

Aspect 18. The method of any one of aspects 1-17, wherein the second monomer component comprises a first dicarboxylic acid component and a second dicarboxylic acid component.

Aspect 19. The method of aspect 18, wherein the first dicarboxylic acid component is present in an amount of about 10 to about 150 parts; wherein the second dicarboxylic acid component is present in an amount of about 10 to about 150 parts; wherein the first dicarboxylic acid component and the second dicarboxylic acid component are present in an aggregate amount of not greater than about 150 parts; and wherein parts are given on a molar basis.

Aspect 20. The method of aspect 18, wherein the first dicarboxylic acid component is present in an amount of about 5 to about 50 parts; wherein the second dicarboxylic acid component is present in an amount of about 60 to about 100 parts; wherein the first dicarboxylic acid component and the second dicarboxylic acid component are present in an aggregate amount of not greater than about 150 parts; and wherein parts are given on a molar basis.

Aspect 21. The method of aspect 18, wherein the first dicarboxylic acid component is present in an amount of about 50 to about 100 parts; wherein the second dicarboxylic acid component is present in an amount of about 50 to about 100 parts; wherein the first dicarboxylic acid component and the second dicarboxylic acid component are present in an aggregate amount of not greater than about 150 parts; and wherein parts are given on a molar basis.

Aspect 22. The method of any one of aspects 18-21, wherein the first dicarboxylic acid component is an aliphatic dicarboxylic acid component; and wherein the second dicarboxylic acid component is an aromatic dicarboxylic acid component.

Aspect 23. The method of aspect 18, wherein the first dicarboxylic acid component is an aliphatic dicarboxylic acid component; wherein the second dicarboxylic acid component is an aliphatic dicarboxylic acid component; and wherein the first dicarboxylic acid component and the second dicarboxylic acid component are not the same.

Aspect 24. The method of aspect 18, wherein the first dicarboxylic acid component is an aromatic dicarboxylic acid component; wherein the second dicarboxylic acid component is an aromatic dicarboxylic acid component; and wherein the first dicarboxylic acid component and the second dicarboxylic acid component are not the same.

Aspect 25. The method of aspect 18, wherein the first dicarboxylic acid component is adipic acid; and wherein the second dicarboxylic acid component is selected from terephthalic acid (TPA) or furandicarboxylic acid (FDCA), or both TPA and FDCA.

Aspect 26. The method of any one of aspects 1-25, wherein the at least one biomass-based monomer component is present in an amount from about 50 wt % to about 100 wt %, based on the total weight of all monomer components in the polycondensation reaction.

Aspect 27. The method of any one of aspects 1-26, wherein the catalyst is titanium isopropoxide.

Aspect 28. The method of any one of aspects 1-27, wherein the biomass-based polyester material has a molecular weight of from about 20 kDa to about 300 kDa.

Aspect 29. The method of aspect 28, wherein the biomass-based polyester material has a molecular weight of from about 70 kDa to about 200 kDa.

Aspect 30. The method of any one of aspects 1-26, wherein the biomass-based polyester material has a molecular weight of greater than or equal to about 20 kDa.

Aspect 31. The method of aspect 30, wherein the biomass-based polyester material has a molecular weight of greater than about 60 kDa.

Aspect 32. The method of any one of aspects 1-31, wherein the biomass-based polyester material has a tensile modulus of from about 90 MPa to about 500 mPa.

Aspect 33. The method of aspect 32, wherein the biomass-based polyester material has a tensile modulus of from about 100 MPa to about 500 mPa.

Aspect 34. The method of aspect 32, wherein the biomass-based polyester material has a tensile modulus of from about 200 MPa to about 500 mPa.

Aspect 35. The method of any one of aspects 1-31, wherein the biomass-based polyester material has a tensile modulus of greater than about 200 mPa.

Aspect 36. The method of aspect 35, wherein the biomass-based polyester material has a tensile modulus of greater than about 240 mPa.

Aspect 37. The method of any one of aspects 1-36, wherein the biomass-based polyester material has a melt strength of from about 5 cN to about 25 cN.

Aspect 38. The method of aspect 37, wherein the biomass-based polyester material has a melt strength of from about 15 cN to about 25 cN.

Aspect 39. The method of any one of aspects 1-38, wherein the biomass-based polyester material has a glass transition temperature of less than or equal to about −10° C.

Aspect 40. The method of any one of aspects 1-37, further comprising polycondensation in the presence of one or more chain extenders.

Aspect 41. The method of aspect 37, wherein the chain extender is a diisocyanate, a pyrometallic dianhydride, or combinations thereof.

Aspect 42. The method of any one of aspects 1-41, wherein the biomass-based polyester material has a structure given by one of the following formulas:

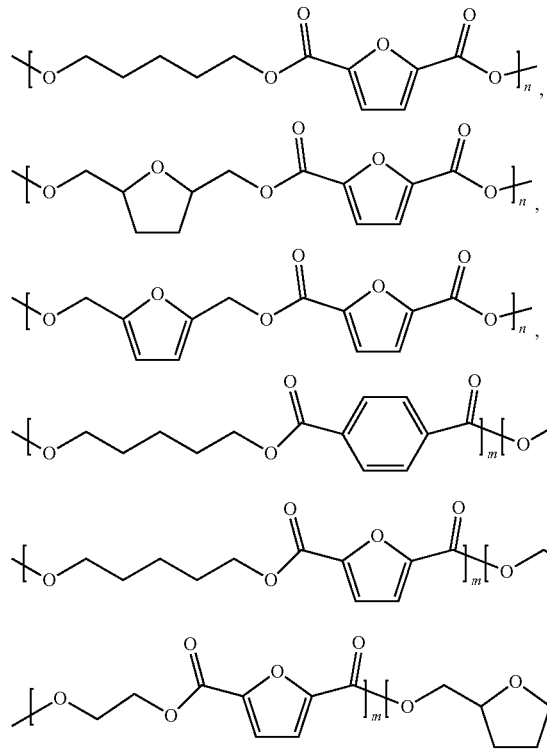
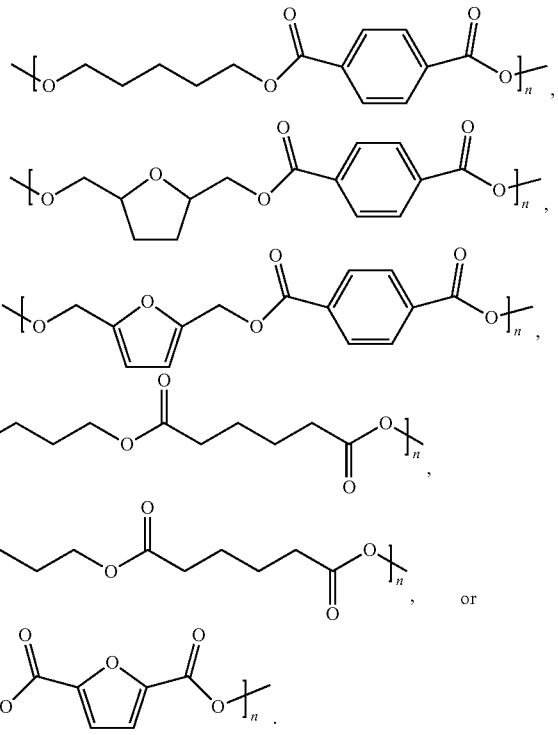

Aspect 43. The method of any one of aspects 1-41, wherein the biomass-based polyester material has a structure given by the formula:

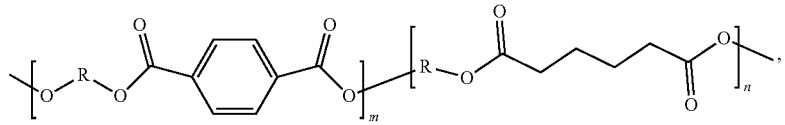

wherein R is a C4-C5 or C5 aliphatic chain.

Aspect 44. A polyester material made by the method of any one of aspects 1-43,

Aspect 45. A biomass-based polyester material comprising repeating units derived from a first monomer component comprising at least one diol and repeating units derived from a second monomer component comprising at least one dicarboxylic acid component;

wherein the repeating units derived from the first monomer component are present in an amount of from about 25 mol % to about 75 mol %;

wherein the repeating units derived from the second monomer component are present in an amount of from about 25 mol % to about 75 mol %;

wherein the ratio of the first monomer to the second monomer, on a molar basis, is from about 1.5:1 to about 1:1.5;

wherein the mol % is based on the total of the repeating units derived from the first monomer component and the repeating units derived from the second monomer component;

wherein the repeating units are derived from at least one biomass-based monomer component; and wherein at least one biomass-based monomer component can be the first monomer component, the second monomer component, and combinations thereof.

Aspect 46. The biomass-based polyester material of aspect 45, wherein the repeating units derived from the first monomer component are present in an amount of from about 35 mol % to about 65 mol %.

Aspect 47. The biomass-based polyester material of aspect 46, wherein the repeating units derived from the first monomer component are present in an amount of from about 40 mol % to about 60 molt %.

Aspect 48. The biomass-based polyester material of aspect 46, wherein the repeating units derived from the first monomer component are present in an amount of from about 45 mol % to about 55 mol %.

Aspect 49. The biomass-based polyester material of any one of aspects 45-48, wherein the repeating units derived from the first monomer component comprise a biomass-based monomer component.

Aspect 50. The biomass-based polyester material of any one of aspects 45-49, wherein the biomass-based monomer is selected from 1,5-pentanediol (1,5-PDO), tetrahydrofurandimethanol (THFDM), furandimethanol (FDM), and combinations thereof, optionally wherein the biomass-based monomer comprises 1,5-pentanediol (1,5-PDO), optionally wherein the biomass-based monomer consists essentially of 1,5-pentanediol (1,5-PDO) (e.g., where less than about 5% of the biomass-based monomer is selection from other monomer (e.g., FDM, THFDM, and the like)).

Aspect 51. The biomass-based polyester material of any one of aspects 45-50, wherein the first monomer component further comprises a monomer component that is not biomass-based.

Aspect 52. The method of aspect 51, wherein the monomer component that is not biomass-based is selected from butanediol, ethylene glycol, propylene glycol, and combinations thereof.

Aspect 53. The biomass-based polyester material of any one of aspects 45-52, wherein the first monomer component comprises a first diol component and a second diol component.

Aspect 54. The biomass-based polyester material of aspect 53, wherein the first diol component is an aromatic diol; wherein the second diol component is an aliphatic diol; and wherein the first diol component is present in an amount of about 0.01 mol % to about 70 mol %, based on the weight of the first diol and second diol.

Aspect 55. The biomass-based polyester material of aspect 53, wherein the first diol component is an aromatic diol; wherein the second diol component is an aliphatic diol; and wherein the first diol component is present in an amount of about 0.01 mol % to about 30 mol %, based on the weight of the first diol and second diol.

Aspect 56. The biomass-based polyester material of any one of aspects 53-55, wherein the first diol component comprises tetrahydrofurandimethanol (THFDM) or furandimethanol (FDM);

and wherein the second diol component comprises 1,5-pentanediol (1,5-PDO).

Aspect 57. The biomass-based polyester material of any one of aspects 45-56, wherein the second monomer component comprises a biomass-based monomer.

Aspect 58. The biomass-based polyester material of aspect 57, wherein the second monomer component is selected from terephthalic acid (TPA), furandicarboxylic acid (FDCA), adipic acid, and combinations thereof (e.g., adipic acid and TPA or adipic acid and FDCA).

Aspect 59. The biomass-based polyester material of any one of aspects 45-58, wherein the second monomer component further comprises a monomer component that is not biomass-based.

Aspect 60. The biomass-based polyester material of aspect 59, wherein the monomer component that is not biomass-based is selected from biphenyl 4,4'-dicarboxylic acid, terephthalic acid (TPA), and combinations thereof.

Aspect 61. The biomass-based polyester material of any one of aspects 45-60, wherein the second monomer component comprises a first dicarboxylic acid component and a second dicarboxylic acid component.

Aspect 62. The biomass-based polyester material of aspect 61, wherein the first dicarboxylic acid component is an aromatic diol; wherein the second diol component is an aliphatic dicarboxylic acid; and wherein the first dicarboxylic acid component is present in an amount of about 60 mol % to about 95 mol %, based on the weight of the first dicarboxylic acid and second dicarboxylic acid.

Aspect 63. The biomass-based polyester material of aspect 61, wherein the first dicarboxylic acid component is an aromatic diol; wherein the second diol component is an aliphatic dicarboxylic acid; and wherein the first dicarboxylic acid component is present in an amount of about 70 mol % to about 95 mol %, based on the weight of the first dicarboxylic acid and second dicarboxylic acid.

Aspect 64. The biomass-based polyester material of aspect 61, wherein the second dicarboxylic acid component is an aliphatic dicarboxylic acid component.

Aspect 65. The biomass-based polyester material of aspect 61, wherein the first dicarboxylic acid component is an aromatic dicarboxylic acid component; wherein the second dicarboxylic acid component is an aliphatic dicarboxylic acid component; and wherein the second dicarboxylic acid is present in an amount of from about 5 mol % to about 10 mol %.

Aspect 66. The biomass-based polyester material of aspect 61, wherein the first dicarboxylic acid component is an aromatic dicarboxylic acid component; wherein the second dicarboxylic acid component is an aliphatic dicarboxylic acid component; and wherein the second dicarboxylic acid is present in an amount of from about 5 mol % to about 25 mol %.

Aspect 67. The biomass-based polyester material of aspect 61, wherein the first dicarboxylic acid component is selected from terephthalic acid (TPA) and furandicarboxylic acid (FDCA); and wherein the second dicarboxylic acid component is adipic acid.

Aspect 68. The biomass-based polyester material of any one of aspects 45-67, wherein the repeating units are derived from at least one biomass-based monomer component are present in an amount from about 50 mol % to about 100 mol %, based on the total of all repeating units.

Aspect 69. The biomass-based polyester material of aspect 68, wherein the repeating units are derived from at least one biomass-based monomer component are present in an amount from about 60 mol % to about 100 mol %, based on the total of all repeating units.

Aspect 70. The biomass-based polyester material of aspect 68, wherein the repeating units are derived from at least one biomass-based monomer component are present in an amount from about 70 mol % to about 100 mol %, based on the total of all repeating units.

Aspect 71. The biomass-based polyester material of aspect 68, wherein the repeating units are derived from at least one biomass-based monomer component are present in an amount from about 80 mol % to about 100 mol %, based on the total of all repeating units.

Aspect 72. The biomass-based polyester material of aspect 68, wherein the repeating units are derived from at least one biomass-based monomer component are present in an amount from about 90 mol % to about 100 mol %, based on the total of all repeating units.

Aspect 73. The biomass-based polyester material of aspect 68, wherein the repeating units are derived from at least one biomass-based monomer component are present in an amount from about 95 mol % to about 100 mol %, based on the total of all repeating units.

Aspect 74. The biomass-based polyester material of any one of aspects 45-73, wherein the biomass-based polyester material has a molecular weight of from about 20 kDa to about 300 kDa.

Aspect 75. The biomass-based polyester material of aspect 74, wherein the biomass-based polyester material has a molecular weight of from about 70 kDa to about 200 kDa.

Aspect 76. The biomass-based polyester material of any one of aspects 45-75, wherein the biomass-based polyester material has a molecular weight of greater than or equal to about 20 kDa.

Aspect 77. The biomass-based polyester material of aspect 76, wherein the biomass-based polyester material has a molecular weight of greater than about 60 kDa.

Aspect 78. The biomass-based polyester material of any one of aspects 45-77, wherein the biomass-based polyester material has a tensile modulus of from about 90 MPa to about 500 mPa.

Aspect 79. The biomass-based polyester material of aspect 78, wherein the biomass-based polyester material has a tensile modulus of from about 100 MPa to about 500 mPa.

Aspect 80. The biomass-based polyester material of aspect 78, wherein the biomass-based polyester material has a tensile modulus of from about 200 MPa to about 500 mPa.

Aspect 81. The biomass-based polyester material of any one of aspects 45-80, wherein the biomass-based polyester material has a tensile modulus of greater than about 200 mPa.

Aspect 82. The biomass-based polyester material of aspect 81, wherein the biomass-based polyester material has a tensile modulus of greater than about 240 mPa.

Aspect 83. The biomass-based polyester material of any one of aspects 45-82, wherein the biomass-based polyester material has a melt strength of from about 5 cN to about 25 cN.

Aspect 84. The biomass-based polyester material of aspect 83, wherein the biomass-based polyester material has a melt strength of from about 15 cN to about 25 cN.

Aspect 85. The biomass-based polyester material of any one of aspects 45-84, wherein the biomass-based polyester material has a glass transition temperature of less than or equal to about −10° C.

Aspect 86. The biomass-based polyester material of any one of aspects 45-85, further comprising polycondensation in the presence of one or more chain extenders.

Aspect 87. The biomass-based polyester material of aspect 86, wherein the chain extender is a diisocyanate, a pyrometallic dianhydride, or combinations thereof.

Aspect 88. The biomass-based polyester material of any one of aspects 45-87, wherein the biomass-based polyester material has a structure given by one of the following formulas:

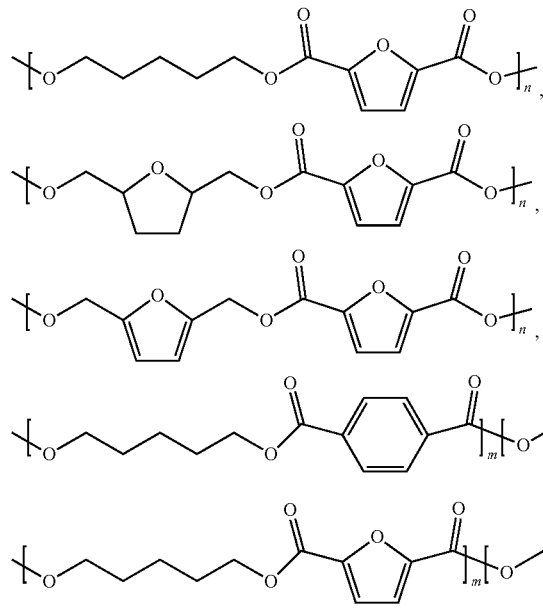
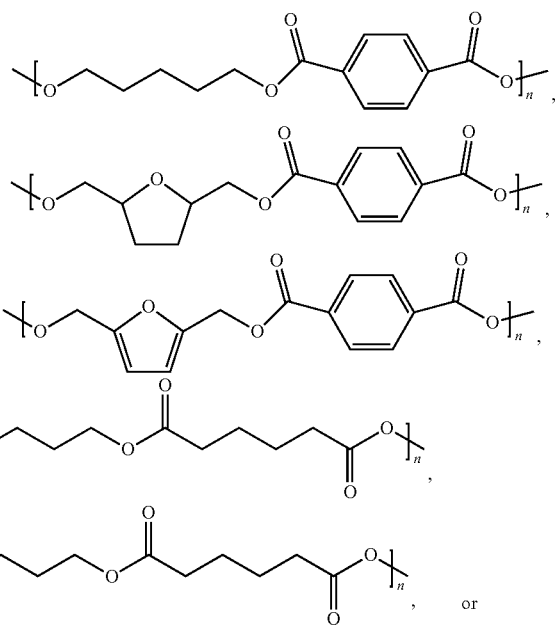

, or

-continued

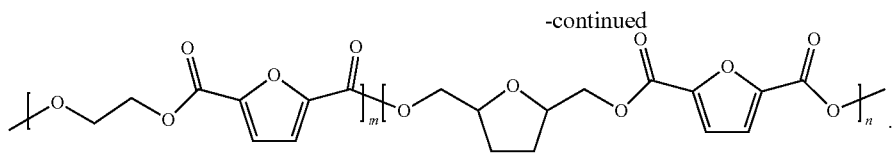

Aspect 89. The biomass-based polyester material of any one of aspects 45-87, wherein the biomass-based polyester material has a structure given by the formula:

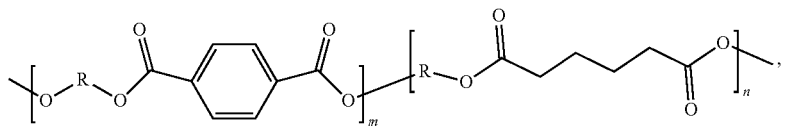

wherein R is a C4-C5 or C5 aliphatic chain.

Aspect 90. A polyester composition comprising a biomass-based polyester material made by the method of any one of aspects 1-43 or the polyester material of any one of aspects 45-89 and an additional polyester material that is substantially not a biomass-based polyester material.

Aspect 91. A polymer composition comprising a biomass-based polyester material made by the method of any one of aspects 1-43 or the polyester material of any one of aspects 45-89, and one or more of (a) an additional polyester material that is substantially not a biomass-based polyester material; and/or (b) non-polyester polymer.

Aspect 92. The polymer composition of aspect 91, wherein the non-polyester polymer is a polyamide, a vinyl polymer, a polyolefin, a polyurethane, or combinations thereof.

Aspect 93. An article comprising the biomass-based polyester material made by the method of any one of aspects 1-43, the polyester material of any one of aspects 45-89, or the polymer composition of aspects 91 or 92.

Aspect 94. The article of aspect 93, wherein the article is a grocery bag, a garbage bag, a component of food packaging, a component of beverage packaging, a film, a laminate, a textile, a carpet, apparel, or a construction material.

Aspect 95. The article of aspects 93 or 94, wherein the article is a laminate comprising at least two laminate layers; wherein at least one laminate layer comprises the biomass-based polyester material made by the method of any one of aspects 1-43 the polyester material of any one of aspects 45-89, or the polymer composition of aspects 91 or 92.

Aspect 96. The article of aspects 93 or 94, wherein the article is a film comprising at least two film layers; wherein at least one film layer comprises the biomass-based polyester material made by the method of any one of aspects 1-43, the polyester material of any one of aspects 45-89, or the polymer composition of aspects 91 or 92.

Aspect 97. The article of any one of aspects 93-96, wherein the article is an injection molded article.

Aspect 98. The article of any one of aspects 93-96, wherein the article is an extrusion molded article.

Aspect 99. An article comprising a component comprising the biomass-based polyester material made by the method of any one of aspects 1-43, the polyester material of any one of aspects 45-89, or the polymer composition of aspects 91 or 92.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and sub-combinations are of utility and may be employed without reference to other features and sub-combinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

H. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

General Polyester Synthesis Procedure

Reactions are carried out using as reactants one or more diol components and one or more dicarboxylic acid components, which are charged to a glass reactor. For example, 1,5 pentane diol, adipic acid, and terephthalic acid are charged to a 0.5 L or 1 L glass reactor in the proportions provided herein below in examples. All components are charged into the reactor vessel. The glass reactor is placed in a heating mantle and sealed with attachments for overhead agitation, inert gas flow, vacuum distillation, and thermometer (monitor condensate temperature) Initially, this reactor is set to connect the mineral oil bubbler to monitor nitrogen flow. The temperature is raised to 175° C. under nitrogen with overhead mixing. During the esterification step, the reaction temperature increases from 175° C. to 230° C. slowly. The reaction is allowed to proceed until >90% of the theoretical water is distilled for the esterification step. At that time, the reactor is set to connect vacuum distillation, and the pressure is reduced to 0.5 mbar to initiate polycondensation reaction. The polycondensation temperature is increased from 230° C. to 250° C. with increasement of 5° C./30 mins and the reaction is allowed to proceed until max viscosity or molecular weight is achieved.

Prospective Example 1: Preparation of Disclosed Semi-Crystalline Polyesters

The present example provides for synthesis of representative disclosed polyesters that are semi-crystalline, biomass-based, recyclable, and biodegradable having properties suitable for flexible packaging films. Several prospective examples are provided herein below disclosing suitable amounts of reactants (i.e., one or more diol components and one or more dicarboxylic acid components) using the foregoing general procedure for preparation of disclosed polyesters.

Example 1A: Briefly, a suitable polyester can be prepared utilizing in the reaction the following (parts are on a molar basis): 5-40 parts adipic acid (aliphatic dicarboxylic acid); 60-95 parts terephthalic acid (aromatic dicarboxylic acid); 150 parts 1,5-pentane diol; and 0.1-10 parts titanium (IV) isopropoxide catalyst.

Example 1B: Briefly, a suitable polyester can be prepared utilizing in the reaction the following (parts are on a molar basis): 5-40 parts adipic acid (aliphatic dicarboxylic acid); 60-95 parts furandicarboxlic acid (FDCA; aromatic dicarboxylic acid); 150 parts 1,5-pentane diol; and 0.1-10 parts titanium (IV) isopropoxide catalyst.

Example 1C: Briefly, a suitable polyester can be prepared utilizing in the reaction the following (parts are on a molar basis): 5-40 parts adipic acid (aliphatic dicarboxylic acid); 60-95 parts terephthalic acid (aromatic dicarboxylic acid); 150 parts of a diol, that is 50-100 parts 1,5-pentane diol and 50-100 parts of furandimethanol (FDM); and 0.1-10 parts titanium (IV) isopropoxide catalyst.

Example 1D: Briefly, a suitable polyester can be prepared utilizing in the reaction the following (parts are on a molar basis): 20-40 parts adipic acid (aliphatic dicarboxylic acid); 60-80 parts terephthalic acid (aromatic dicarboxylic acid); 150 parts 1,5-pentane diol; and 0.1-1 parts titanium (IV) isopropoxide catalyst.

Example 1E: Briefly, a suitable polyester can be prepared utilizing in the reaction the following (parts are on a molar basis): 20-40 parts adipic acid (aliphatic dicarboxylic acid); 60-80 parts furandicarboxlic acid (FDCA; aromatic dicarboxylic acid); 150 parts 1,5-pentane diol; and 0.1-1 parts titanium (IV) isopropoxide catalyst.

Example 1F: Briefly, a suitable polyester can be prepared utilizing in the reaction the following (parts are on a molar basis): 20-40 parts adipic acid (aliphatic dicarboxylic acid); 60-80 parts terephthalic acid (aromatic dicarboxylic acid); 150 parts of a diol, that is 50-100 parts 1,5-pentane diol and 50-100 parts of furandimethanol (FDM); and 0.1-1 parts titanium (IV) isopropoxide catalyst.

It is believed that the semi-crystalline, biomass-based, recyclable, and biodegradable polyesters prepared using the foregoing methods can have a tensile modulus from about 60 MPa to about 500 MPa; molecular weights of from about 20 kDa to about 200 kDa; and/or a melting temperature ($T_m$) of from about 60° C. to about 250° C. In some instances, polyesters prepared using the foregoing methods can have a tensile modulus greater than or equal to about 80 MPa; molecular weights greater than or equal to about 60 kDa; and/or a melting temperature ($T_m$) of from about 70° C. to about 115° C.

The molecular weight of the polyesters described above can be determined by gel permeation chromatography (GPC) as known to the skilled artisan. For example, suitable GPC include the methods or based on the methods described by Herrerra, et al. (J. Poly. Chem. (2002) 40 (23): 4141-4157). In some instances, the molecular weight of the polyesters prepared herein can be determined based on methods described by Herrerra, et al., using THF as the eluent with polystyrene molecular weight standards or 2,2,2-trifluoroethanol as eluent with poly (methyl methacrylate) as standards. However, choice of column, eluent, suitable molecular weight standards, and chromatographic parameters (e.g., flow rate, detection method, and elution gradient) can be optimized as deemed best for the given polyester for which a molecular weight is determined.

The tensile modulus of the polyesters described above can be determined by a suitable method as known to the skilled artisan. For example, a stress-strain study can be carried out using the methods or based on the methods described by Herrerra, et al. (J. Poly. Chem. (2002) 40(23): 4141-4157). Briefly, a film sample is strained at a deformation rate of about 10 mm/min, and the stress is calculated by force measurements. The film sample is prepared at about 0.5 millimeter thickness using a heated hydraulic press (melt press), although the film sample thickness and length can be modified for consistent results. In general, data are determined as an average based on at least 3 test runs per sample. The aforementioned studies can be carried out using a universal testing machine (e.g., such those available from Instron or MTS) or a dynamic mechanical analysis machine (DMA, such as one made by TA Instruments).

The foregoing polyesters can be prepared including chain extenders, e.g., pyromellitic dianhydride or diisocyanates. These chain extenders can be used a suitable weight percent in the reaction, e.g., from about 0.01 wt % to about 5 wt %, based on total weight of polyester (e.g., see Int. Pat. Publ. WO 03/066704). The foregoing synthesis method, as described herein above, can be modified as desired to further comprise additional polymerization. For example, a polyester prepared as described herein can be heated at a suitable temperature that is between the $T_g$ and $T_m$ of the specific polyester, in order to induce crystallization, for a suitable period of time, e.g., from about 5 hours to about 72 hours. In some instances, heating can be carried out for a period of time from about 10 hours to about 48 hours. The heating can be carried out using a rotating drum/flask apparatus. The foregoing polyesters can also be heated above their $T_m$ to generate thin films to reduce mass transfer path of by-product and thus to further improve molecular weights.

Prospective Example 2: Chemical Degradation of Disclosed Polyesters

The disclosed biomass-based polyester materials are believed to be more amenable to recycling. Polyester chemical recycling processes are being developed to produce the constituent monomers from the polyester and re-polymerize these monomers to fresh, high-quality polyesters. These chemical recycling approaches have several advantages over mechanical recycling. Mechanical recycling degrades the polymer molecular weight, while chemical recycling back to the original monomers allows for re-use of these monomers in virgin polyesters after purification.

PET is an attractive target for chemical recycling due to its ubiquity as a consumer plastic. Four main chemical PET recycling strategies have been pursued based on hydrolysis, glycolysis, and methanolysis as shown below (Ref. 72). The disclosed biomass-based polyester materials are believed to be amenable to some or all of these approaches for recycling the polyesters, and each of these approaches can be assessed for the disclosed biomass-based polyester materials as described herein immediately below.

NaOH or KOH produces EG and a salt of TPA. After distillation to recover EG, the TPA can be recovered by neutralization of the product mixture.[74] This method achieves near-quantitative TPA yields and is suitable for the treatment of contaminated, post-consumer PET. The main drawback of this approach is that it requires stoichiometric amounts of base. Addition of a phase transfer catalyst promotes interaction between the hydrophobic PET and the aqueous base catalyst and facilitates depolymerization at lower temperature (<100° C.; see Ref. 75).

Methanolysis of PET uses methanol to depolymerize PET and produces dimethyl terephthalate (DMT) and EG (Ref. 72). This process can be carried out at 180-240° C. and 2-4 MPa. DMT can be purified by distillation to remove contaminants and then used as a raw material to produce PET. EG and MeOH are recoverable by distillation as well. One challenge with this process is that production of TPA

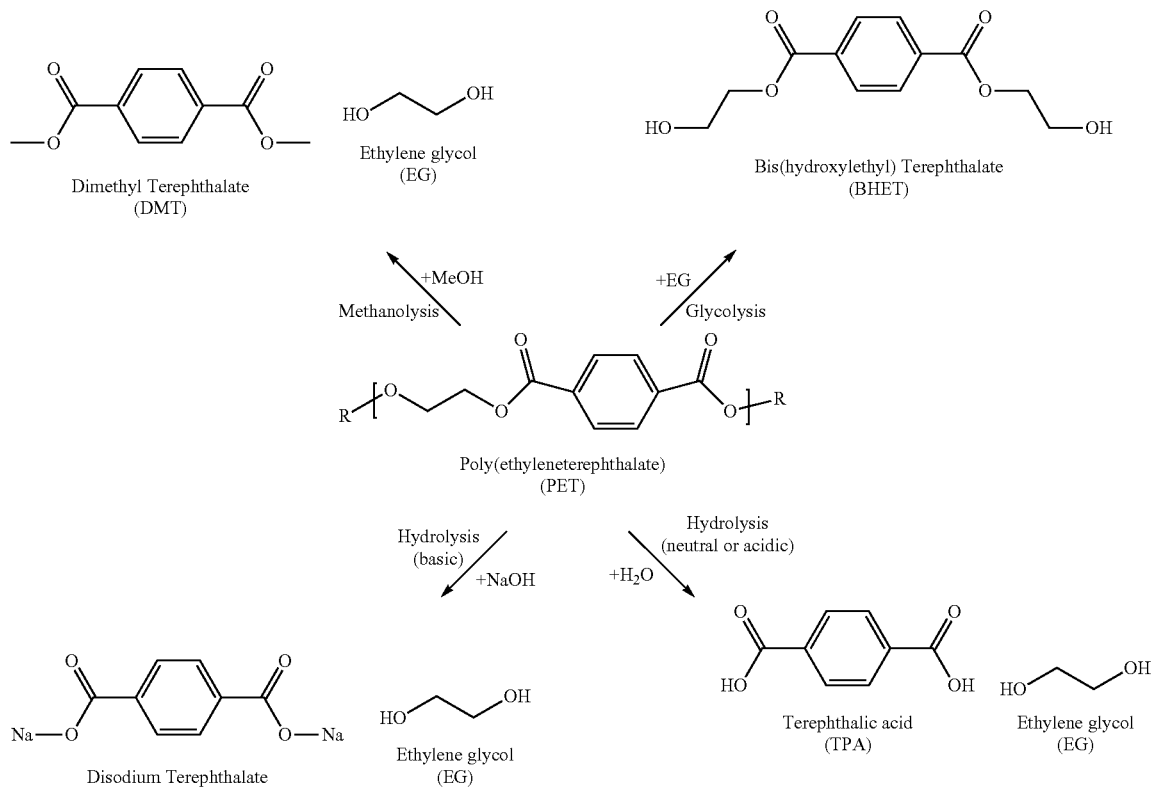

PET hydrolysis can be carried out in acidic, basic, or neutral conditions, and the specific route that is used has an impact on the nature of the product that is produced. The use of neutral or acidic conditions produces the original monomers TPA and EG. Neutral conditions require higher temperature (e.g., 200-300° C.), can be carried out in >90% monomer yield (Ref. 72), and are proposed to be autocatalytic with acids formed during the reaction catalyzing further depolymerization. While this approach avoids the use of strong acids or bases, impurities from PET are left in the TPA product. Concentrated $H_2SO_4$ allows for depolymerization to TPA and EG at lower temperature, but use of strong acids requires the use of other corrosion-resistant materials and the separation or neutralization of $H_2SO_4$ (in addition to subsequent waste disposal; see Ref. 73). Hydrolysis under alkaline conditions in aqueous solutions of requires an additional DMT hydrolysis step. Glycolysis of PET involves depolymerization by addition of EG, thus forming bis(hydroxyethyl) terephthalate (BHET) as well as other oligomers (Ref. 76). This process can be carried out at 180-240° C. and utilizing a variety of catalysts. The main benefit is that BHET can be integrated directly into existing PET production infrastructure. One drawback is that other oligomers may be formed that are difficult to separate from BHET.

IBM is developing a glycolysis approach ("VOLCAT") to catalytically depolymerize PET into BHET in ~80% yield and >99% purity (Ref. 77). This process can be carried out using an organic base catalyst (1,8-diazabicyclo [5.4.0] undec-7-ene, or "DBU") in ethylene glycol solvent. The process is robust toward contamination and was successfully demonstrated on post-consumer recycled PET without sorting or cleaning, thereby reducing recycling costs. The DBU catalyst is volatile and can be recovered and re-used.

Computational chemistry has been shown to be a useful method to gain insight into the mechanism of polyester depolymerization and guide the rational design of new catalysts and recycling technologies. Specifically, the glycolytic depolymerization of PET by organic base catalyst 1,5,7-triazabicyclododecene (TBD) or DBU in ethylene glycol solvent has been investigated using Density Functional Theory (DFT) calculations (Ref. 78). It was reported that the rate-determining step is the EG-involved nucleophilic step of a bifunctional reaction mechanism in which a glycol solvent molecule activates the carbonyl group of the polyester while the organic base catalyst activates the reacting glycol. The insights derived from these computations led to the development of amine-based catalytic technologies for PET depolymerization (Ref. 79-80).

Example 3: Synthesis of High Molecular Weight Poly (Pentylene Adipate-Co-Terephthalate) (PPAT)

3.0 Comparative Example 220.2 g 1,5-pentanediol, 0.33 g glycerol and 1.19 mL phosphoric acid solution in water (0.1 g/mL) were added into 0.5 L reactor and mixed well at 175° C. with agitation rate of 100 rpm. After 20 mins, 0.346 g titanium (IV) isopropoxide was added into the reactor with nitrogen purging. After mixing for 40 mins, 118.5 g terephthalic acid and 69.6 g adipic acid were added. The esterification temperature was increased from 175° C. to 230° C. slowly. After esterification reaction was carried for 11 hrs and 90% of theoretical water was collected, vacuum was slowly adjusted to 0.5 mbar and the polycondensation temperature was increased from 230° C. to 250° C. with an increment of 5° C./30 mins. The reaction was stopped when the medium intrinsic viscosity was achieved (IV=0.526 dL/g). After this point, the IV cannot be further increased. Refer to Table 1 for properties.

3.1 Example 1 (an Embodiment of the Present Disclosure)

The synthesis involves two steps. First, the synthesis was conducted in a 0.5 L reactor with procedure is similar to comparative example except that phosphoric acid was not used. PPAT with IV=0.616 dL/g was synthesized, cooled and collected. Secondly, 2.5 g PPAT with IV=0.616 dL/g was transferred into a 50 mL flat-bottom flask, which was preheated to 230° C. in an oil bath. 1.6 mm PPAT melt films were generated. Reaction was conducted at ultra-high vacuum, 0.02 mbar-0.01 mbar. After 4 hours, the Mw reached to 105 KDa. Refer to Table 1 for properties.

3.2 Example 2 (an Embodiment of the Present Disclosure)

Synthesis procedure is similar to Inventive Example 1. The thin-film polymerization was conducted for 6 hours, the Mw was achieved to 145 KDa. Refer to Table 1 for properties. 3.3 Example 3 (an embodiment of the present disclosure)

The synthesis involves two steps. First, the synthesis was conducted in 0.5 L reactor, similar to Inventive Example 1. PPAT with IV=0.616 dL/g was synthesized and collected. Secondly, 20 g PPAT with IV=0.616 dL/g was blended with 0.5 wt % 4,4'-methylene diphenyl diisocyanate (MDI) in a melt blender at 200° C. for 15 mins. Refer to Table 1 for properties.

3.4 Example 4 (an Embodiment of the Present Disclosure)

Synthesis procedure is similar to Inventive Example 3 except that 1 wt % MDI was used as chain extender.

3.5 Example 5 (an Embodiment of the Present Disclosure)

Synthesis procedure is similar to Inventive Example 3 except that 1.5 wt % MDI was used as chain extender.

3.6 Example 6 (an Embodiment of the Present Disclosure)

The synthesis was conducted in a 0.5 L reactor with a high-torque overhead mixer to improve mixing and devolatilization. 220.2 g 1,5-pentanediol, 0.33 g glycerol, 118.5 g terephthalic acid and 69.6 g adipic acid were added into 0.5 L reactor and mixed well at 175° C. with nitrogen purging. After 20 mins, 0.346 g titanium (IV) isopropoxide was added into the reactor. The esterification temperature was increased from 175° C. to 230° C. slowly. After esterification reaction was carried for 11 hrs and 90% of theoretical water was collected, vacuum was slowly adjusted to 0.5 mbar and the polycondensation temperature was increased from 230° C. to 250° C. with an increment of 5° C./30 mins. The high-torque mixer allowed to continue the polycondensation reaction after the intrinsic viscosity reached to 0.616 dL/g. The agitation rate reached to 160 rpm and max torque of 200 Ncm was achieved. Finally, PPAT with IV of 0.85 dL/g (corresponding Mw=80 KDa) was synthesized in one single batch.

3.7 Example 7 (an Embodiment of the Present Disclosure)

PPAT compression films from Inventive Example 1 were annealed at 40° C. for 8 hours. The tensile modulus was improved as shown in Table 1.

TABLE 1

Molecular Wight (Mw), Polydispersity (PDI), Thermal Transitions (Tg, Tm), and Tensile Modulus (E), Yield Strength ($\delta y$), Elongation at Yield ($\varepsilon y$), Tensile Strength ($\delta b$) and Elongation at Break ($\varepsilon b$) of PPAT Compression Molded Films.

| Samples | Mw (KDa) | PDI | Tg (° C.) | Tm (° C.) | E (MPa) | $\delta_y$ (MPa) | $\varepsilon_y$ (%) | $\delta_b$ (MPa) | $\varepsilon_b$ (%) |
|---|---|---|---|---|---|---|---|---|---|
| Comp Ex | 32 | 1.8 | −24 | 82.7 | 96.2 ± 2.3 | / | / | 7.4 ± 0.1 | 23 ± 3 |
| Ex 1 | 105 | 3.2 | −22.8 | 83.7 | 75.2 ± 4.8 | 6.7 ± 0.17 | 20.8 ± 0.5 | 16.8 ± 1.1 | 1073 ± 104 |
| Ex 2 | 145 | 4.2 | −18.1 | 82.6 | 67.5 ± 3.9 | 6.0 ± 0.12 | 23.9 ± 1.1 | 16.6 ± 1.4 | 1057 ± 54 |
| Ex 3 | 71 | 2.3 | −21.6 | 80.9 | 65.5 ± 2.4 | 5.7 ± 0.16 | 23.4 ± 2.0 | 11.4 ± 0.7 | 1099 ± 55 |

TABLE 1-continued

Molecular Wight (Mw), Polydispersity (PDI), Thermal Transitions (Tg, Tm),
and Tensile Modulus (E), Yield Strength (δy), Elongation at Yield (εy),
Tensile Strength (δb) and Elongation at Break (εb) of PPAT Compression Molded Films.

| Samples | Mw (KDa) | PDI | Tg (° C.) | Tm (° C.) | E (MPa) | $\delta_y$ (MPa) | $\varepsilon_y$ (%) | $\delta_b$ (MPa) | $\varepsilon_b$ (%) |
|---|---|---|---|---|---|---|---|---|---|
| Ex 4 | 127 | 3.6 | −20.3 | 75.4 | 64.7 ± 3.1 | 5.5 ± 0.1 | 20.2 ± 2.4 | 16.9 ± 3.4 | 1282 ± 186 |
| Ex 5 | 142 | 4.1 | −19.7 | 72.9 | 60.2 ± 1.7 | 5.8 ± 0.07 | 25.9 ± 3.1 | 22.4 ± 0.6 | 1290 ± 18 |
| Ex 6 | 80 | / | / | / | / | / | / | / | / |
| Ex 7 | 105 | 3.2 | / | / | 83.6 ± 3.8 | 6.8 ± 0.5 | 22.1 ± 3.4 | 17.0 ± 0.4 | 1137 ± 23 |

Intrinsic Viscosity Measurement

Intrinsic viscosity (IV) was tested by Ubbelohde viscometer at 25° C. using 5 g/L polymer solution in chloroform.

Molecular Wight and Polydispersity Measurement

Polyester molecular weight (weight-average: Mw, number-average: Mn) and polydispersity (PDI) were characterized by gel permeation chromatography (GPC) operated at 40° C. using 2,2,2-Trifluoroethanol as eluent at a flow rate of 1 mL/min on an Agilent 1200 series system with a refractive index detector. PMMA was used as standards. Polymers were dissolved in TFE solvent at 3 mg/mL, and then filtered through 0.45 μm PTFE filter prior to injecting to GPC columns.

Thermal Transition Temperatures Measurement

Thermal transitions were determined using differential scanning calorimetry (DSC) (TA Instruments Q200) with a nitrogen flow rate of 50 mL/min. The DSC temperature calibration was performed using Indium's melting point. The samples were heated to 200° C. from 25° C. at a rate of 10° C./min, cooled to −50° C. at a rate of 10° C./min and heated to 200° C. at a rate of 10° C./min. Glass transition temperature (Tg) was calculated from second heating ramp. Maximum of melting peak from the first heating ramp was recorded as Tm.

Tensile Properties Measurement

Mechanical properties were tested by Instron. Uniform polymer films were prepared by heat press machine at 180° C. All films had similar thickness of 0.5 mm and were cut into dumbbell-shaped specimens (3.8*1.6*0.5 mm) followed by annealing at room temperature for one week prior to tensile testing. 3-5 specimens of each polymer films were drawn at a rate of 1.27 mm/min, and stress-strain curves were recorded. Tensile modulus (E, within 2% strain), yield strength ($\delta_y$), elongation at yield ($\varepsilon_y$), tensile strength ($\delta_b$) and elongation at break ($\varepsilon_b$) with standard deviations were calculated.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A biomass-based polyester material comprising:
   repeating units derived from a first monomer component, wherein the first monomer component is 1,5-pentanediol (1,5-PDO), wherein 1,5-pentanediol (1,5-PDO) is a biomass-based monomer component, and
   repeating units derived from a pair of second monomer components, wherein the pair of second monomer components are adipic acid and terephthalic acid (TPA);
   wherein the repeating units derived from the first monomer component are present in an amount of from about 25 mol % to about 75 mol %;
   wherein the repeating units derived from the pair of second monomer components are present in an amount of from about 25 mol % to about 75 mol %;
   wherein the ratio of the first monomer component to the pair of second monomer components, on a molar basis, is from about 1.5:1 to about 1:1.5; and
   wherein the mol % is based on the total of the repeating units derived from the first monomer component and the repeating units derived from the pair of second monomer components.

2. The biomass-based polyester material of claim 1, wherein the repeating units derived from the first monomer component are present in an amount of from about 35 mol % to about 65 mol %.

3. The biomass-based polyester material of claim 1, wherein the biomass-based polyester material has a molecular weight of from about 70 kDa to about 200 kDa.

4. The biomass-based polyester material of claim 1, wherein the biomass-based polyester material has melting temperature ($T_m$) of from about 90° C. to about 115° C., wherein the biomass-based polyester material has a molecular weight (weight average) of from about 80 kDa to about 200 kDa, and wherein the glass transition temperature (Tg) is less than or equal to about −10° C.

5. The biomass-based polyester material of claim 1, wherein the repeating units derived from the first monomer component are present in an amount of from about 45 mol % to about 55 mol %.

6. The biomass-based polyester material of claim 1, wherein the ratio of the first monomer component to the pair of second monomer components, on a molar basis, is about 1:1.

7. The biomass-based polyester material of claim 1, wherein the ratio of the first monomer component to the pair of second monomer components, on a molar basis, is about 1:1.1 to 1.1:1.

8. The biomass-based polyester material of claim 1, wherein the ratio of the adipic acid to the terephthalic acid (TPA) is about 1:2 to 2:1.

9. The biomass-based polyester material of claim 1, wherein adipic acid is present in an amount of about 5 mol % to about 40 mol % and terephthalic acid (TPA) is present in an amount of about 60 mol % to about 95 mol %.

\* \* \* \* \*